US007640918B2

(12) United States Patent
Perryman et al.

(10) Patent No.: US 7,640,918 B2
(45) Date of Patent: Jan. 5, 2010

(54) DRIVE CIRCUIT FOR AN INJECTOR ARRANGEMENT AND A DIAGNOSTIC METHOD

(75) Inventors: Louisa Perryman, Rainham (GB); Nigel P. Baker, Canterbury (GB); Steven Martin, Canterbury (GB); Martin A. P. Sykes, Rainham (GB)

(73) Assignee: Delphi Technologies, Inc., Troy, MI (US)

( * ) Notice: Subject to any disclaimer, the term of this patent is extended or adjusted under 35 U.S.C. 154(b) by 132 days.

(21) Appl. No.: 11/732,295

(22) Filed: Apr. 3, 2007

(65) Prior Publication Data

US 2007/0227506 A1 Oct. 4, 2007

(30) Foreign Application Priority Data

Apr. 3, 2006 (EP) .................................. 06251881

(51) Int. Cl.
*F02M 51/00* (2006.01)
*G06F 19/00* (2006.01)

(52) U.S. Cl. ........................ 123/479; 123/490; 701/114

(58) Field of Classification Search ................. 123/479, 123/480, 490; 701/114; 73/114.14, 114.15, 73/114.16, 117.02, 117.03; 361/152, 160; 310/314

See application file for complete search history.

(56) References Cited

U.S. PATENT DOCUMENTS 5,861,746 A * 1/1999 Ensten .................. 324/207.16
6,472,796 B1 10/2002 Hoffmann et al.
6,487,505 B1 11/2002 Mock et al.
6,560,528 B1 * 5/2003 Gitlin et al. ................. 701/115
6,760,212 B2 * 7/2004 Cheever et al. ............. 361/160
6,923,161 B2 * 8/2005 Vierling et al. .............. 123/490
7,124,741 B2 * 10/2006 Cagnoni et al. ............. 123/472
2001/0039484 A1 11/2001 Freudenberg et al.
2004/0008032 A1 1/2004 Rueger et al.
2007/0103033 A1 * 5/2007 Martin ....................... 310/317

FOREIGN PATENT DOCUMENTS

JP 2002-227698 8/2002
JP 2002-246667 8/2002
WO WO 2005/028836 3/2005

OTHER PUBLICATIONS

Japan Office Action dated Jun. 18, 2009.

* cited by examiner

*Primary Examiner*—Stephen K Cronin
*Assistant Examiner*—Johnny H Hoang
(74) *Attorney, Agent, or Firm*—Thomas N. Twomey

(57) ABSTRACT

The invention relates to a drive circuit for an injector arrangement having a fuel injector, and a method of detecting faults in the drive circuit. The drive circuit includes a diagnostic tool that senses a measured voltage between the injector and a known voltage level. The measured voltage is biased with respect to the known voltage to a predicted voltage unless the drive circuit has a fault. A fault signal is provided on sensing of a measured voltage that differs from the predicted voltage. The drive circuit may additionally, or alternatively, include a diagnostic tool. The diagnostic tool senses a detected current to provide a fault signal upon detection of the fault when the detected current is at variance from a threshold current.

20 Claims, 14 Drawing Sheets

DRIVE CIRCUIT FOR AN INJECTOR ARRANGEMENT AND A DIAGNOSTIC METHOD

TECHNICAL FIELD

The present invention relates to a drive circuit for an injector arrangement having a diagnostic means for detecting a fault, and a diagnostic method for the drive circuit of an injector arrangement. The drive circuit is especially, although not exclusively, for an injector arrangement in an internal combustion engine, the injector arrangement including an injector of the type having a piezoelectric actuator for controlling injector valve needle movement.

BACKGROUND ART

Automotive vehicle engines are generally equipped with fuel injectors for injecting fuel (e.g., gasoline or diesel fuel) into the individual cylinders or intake manifold of the engine. The engine fuel injectors are coupled to a fuel rail which contains high pressure fuel that is delivered by way of a fuel delivery system. In diesel engines, conventional fuel injectors typically employ a valve that is actuated to open and to close in order to control the amount of fluid fuel metered from the fuel rail and injected into the corresponding engine cylinder or intake manifold.

One type of fuel injector that offers precise metering of fuel is the piezoelectric fuel injector. Piezoelectric fuel injectors employ piezoelectric actuators made of a stack of piezoelectric elements arranged mechanically in series for opening and for closing an injection valve to meter fuel injected into the engine. Piezoelectric fuel injectors are well known for use in automotive engines.

The metering of fuel with a piezoelectric fuel injector is generally achieved by controlling the electrical voltage potential applied to the piezoelectric elements to vary the amount of expansion and contraction of the piezoelectric elements. The amount of expansion and contraction of the piezoelectric elements varies the travel distance of a valve piston and, thus, the amount of fuel that is passed through the fuel injector. Piezoelectric fuel injectors offer the ability to meter precisely a small amount of fuel.

Typically, the fuel injectors are grouped together in banks of one or more injectors. As described in EP1400676, each bank of injectors has its own drive circuit for controlling operation of the injectors. The circuitry includes a power supply, such as a transformer, which steps-up the voltage $V_S$ generated by the power supply, i.e. from 12 Volts to a higher voltage, and storage capacitors for storing charge and, thus, energy. The higher voltage is applied across the storage capacitors which are used to power the charging and discharging of the piezoelectric fuel injectors for each injection event. Drive circuits have also been developed, as described in WO 2005/028836A1, which do not require a dedicated power supply, such as a transformer.

The use of these drive circuits enables the voltage applied across the storage capacitors, and thus the piezoelectric fuel injectors, to be controlled dynamically. This is achieved by using two storage capacitors which are alternately connected to an injector arrangement. One of the storage capacitors is connected to the injector arrangement during a discharge phase when a discharge current flows through the injector arrangement, initiating an injection event. The other storage capacitor is connected to the injector arrangement during a charging phase, terminating the injection event. A regeneration switch is used at the end of the charging phase, before a later discharge phase, to replenish the storage capacitors.

Like any circuit, faults may occur in a drive circuit. In safety critical systems, such as diesel engine fuel injection systems, a fault in the drive circuit may lead to a failure of the injection system, which could consequentially result in a catastrophic failure of the engine. A robust diagnostic system is therefore required to detect critical failure modes of piezoelectric actuators, and of the associated drive circuits, particularly whilst the drive circuit is in use.

An aim of the invention is therefore to provide a diagnostic tool that is capable of detecting critical failure modes, or fault response characteristics, of an injector arrangement, and the associated drive circuits, and a method of operating the diagnostic tool.

STATEMENTS OF THE INVENTION

According to a first aspect of the invention there is provided: a drive circuit for an injector arrangement comprising a fuel injector, the drive circuit comprising diagnostic means operable: a) to sense a measured voltage between the injector and a known voltage level, the measured voltage being biased with respect to the known voltage to a predicted voltage unless the drive circuit has a fault; and b) to provide a fault signal on sensing of a measured voltage that differs from the predicted voltage.

An advantage is that the drive circuit comprises a robust diagnostic system that is capable of detecting critical failure modes of the drive circuit, preventing failure of the drive circuit and the injector arrangement to which the drive circuit is connected. The diagnostic means uses a voltage associated with the fuel injector in order to detect the fault and to identify the type of fault.

The drive circuit may further comprise selector switch means operable to select the fuel injector into the drive circuit and to deselect the fuel injector from the drive circuit. Advantageously, the fuel injector may also be connected to and removed from the drive circuit by operation of the selector switch means.

The predicted voltage may be the voltage between the fuel injector and the known voltage level when the injector is deselected from the drive circuit. Beneficially, the diagnostic means is capable of detecting a short circuit fault associated with the fuel injector. Thus, it is possible to detect the short circuit without having to select the injector (and hence connect it to the drive circuit), restricting the damage caused to it and the rest of the drive circuit by a short circuit fault.

The diagnostic means is, preferably, capable of detecting an open circuit fault associated with the fuel injector. In this case, the predicted voltage may be substantially the sum of the known voltage and a voltage across the fuel injector when the fuel injector is selected in the drive circuit.

The selector switch means may be operable to enable detection of a fault. Preferably, the selector switch means is operable prior to detection of the fault. Beneficially, open circuit faults associated with the fuel injector can be detected when voltage is being sensed.

The signal may be provided if the measured voltage is outside a tolerance voltage of the predicted voltage. This provides the benefit that the diagnostic means only provides a signal where the fuel injector is unable to function satisfactorily.

The measured voltage may be sensed across part of a potential divider connected to the injector and the known voltage. The potential divider may be connected to a high voltage rail. The injector may have a high side and the diagnostic means may be operable to sense a measured voltage between the high side of the fuel injector and the known voltage. The low side of the injector may be connected a low voltage rail. The low voltage rail may, in use, be at a lower voltage than the high voltage rail. The divider may comprise at least two resistive elements. The resistive elements may each have a high resistance.

The diagnostic means may be in a connection of the drive circuit to a ground potential. The diagnostic means may be operable to sense a detected current. The diagnostic means may also be operable by sensing a current to provide a signal on detection of a fault. Preferably, the signal is provided when the detected current is at variance from a threshold current. Advantageously, the diagnostic means uses a current associated with the fuel injector, in order to detect a fault. The type of short circuit fault can be determined by the sensing current that is used to determine the presence of a fault.

The signal may be provided when the detected current is greater than the threshold current. The diagnostic means may comprise a resistive element through which the detected current is sensed. The connection of the drive circuit to the ground potential may be connected to charge storage means. The connection of the drive circuit to the ground potential may be connected to a discharge switch.

The drive circuit may comprise first charge storage means (e.g. comprising a capacitor) for operative connection with the fuel injector during a charging phase so as to cause a charge current to flow therethrough. The drive circuit may comprise second charge storage means (e.g. comprising a capacitor) for operative connection with the fuel injector during a discharge phase so as to permit a discharge current to flow therethrough. The drive circuit may comprise switch means for operably controlling the connection of the fuel injector to the first charge storage means or the second charge storage means. The discharging phase may initiate an injection event, and the charging phase may terminate the injection event, or vice versa. In another embodiment there may be only one charge storage means.

The switch means may comprise a charge switch operable to close so as to activate the charging phase. Advantageously, when sensing current to detect a fault, high side short circuit faults can be detected. Also, where there is no or negligible charge on the fuel injector, low side short circuit faults can be detected.

The switch means may comprise a discharge switch operable to close so as to activate the discharge phase. Preferably, when sensing current to detect a fault, a low side to ground potential short circuit fault can be detected at start up if there is residual charge on the fuel injector.

The drive circuit may comprise a power supply means. The drive circuit may comprise regeneration switch means. Operating the regeneration switch provides an advantage of enabling detection of a fault. Preferably, the regeneration switch is operated prior to the detection of the fault. The regeneration switch means may be operable at the end of the charging phase to transfer charge. The operation of the regeneration switch means may transfer charge from the power supply means to the first charge storage means, before a subsequent discharging phase. In one mode of operation, the drive circuit may be deliberately tripped at start-up when sensing current to detect a fault in order to rule out high side and low side to ground short circuit faults. Note that in this mode of operation, low side to ground short circuit faults may only be detected by using the regeneration switch means if there is no charge, if any, on the fuel injector. In another mode of operation, the regeneration switch is operated during normal running conditions to detect a fault.

Charge may be transferred from the first to the second charge storage means via an energy storage device. The drive circuit is particularly suitable for use with fuel injectors comprising a piezoelectric actuator, but other fuel injector types are also envisaged (e.g. solenoid actuated).

According to a second aspect of the invention there is provided a drive circuit for an injector arrangement comprising a fuel injector, the drive circuit comprising diagnostic means in a connection of the drive circuit to a ground potential, the diagnostic means being operable: a) to sense a detected current; and b) to provide a signal on detection of a fault, wherein the signal is provided when the detected current is at variance from a threshold current. This aspect of the invention provides a robust diagnostic system to detect critical failure modes of the drive circuit, preventing failure of the drive circuit and the injector arrangement to which it is connected. The diagnostic means uses a current associated with the fuel injector, in order to detect a fault. The type of short circuit fault can be determined from the sensed current.

The signal may be provided when the detected current is greater than the threshold current. The connection of the drive circuit to the ground potential may be connected to charge storage means.

The charge storage means may comprise first charge storage means for operative connection with the fuel injector during a charging phase so as to cause a charge current to flow therethrough. Additionally, the charge storage means may comprise second charge storage means for operative connection with the fuel injection during a discharge phase so as to permit a discharge current to flow therethrough.

The connection of the drive circuit to the ground potential may be connected to switch means for operably controlling the connection of the fuel injector to the first charge storage means or the second charge storage means.

The switch means typically includes one or more of a charge switch operable to close so as to activate the charging phase and a discharge switch operable to close so as to activate the discharging phase. The connection of the drive circuit to the ground potential may be connected to the discharge switch.

The drive circuit may comprise a power supply means. The drive circuit may comprise regeneration switch means. The regeneration switch means may be operable at the end of the charging phase to transfer charge from the power supply means to the first charge storage means, before a subsequent discharging phase.

In another embodiment, only one charge storage means is provided.

The drive circuit may comprise selector switch means. It may be beneficial to have the selector switch means operable to select the fuel injector into the drive circuit so as to enable a high side to ground potential short circuit fault to be detected.

Accordingly, the second aspect of the invention may take any of the optional features of the first aspect of the invention.

According to a third aspect of the invention there is provided a drive circuit for an injector arrangement comprising a fuel injector, the drive circuit comprising: i) first charge storage means for operative connection with the fuel injector during a charging phase so as to cause a charge current to flow therethrough; ii) second charge storage means for operative connection with the fuel injector during a discharge phase so as to permit a discharge current to flow therethrough; iii) switch means for operably controlling the connection of the fuel injector to the first charge storage means or the second charge storage means; and diagnostic means operable to provide a signal on detection of a fault. Preferably, the switch means is operable prior to detection of the fault.

Accordingly, the third aspect of the invention may take any of the optional features of the first or second aspects of the invention.

According to a fourth aspect of the invention there is provided an injector bank for an automotive engine, the bank comprising a fuel injector and a drive circuit according to any of the first, second or third aspects of the invention, wherein the fuel injector is operable by the drive circuit.

According to a fifth aspect of the invention there is provided an engine control module for controlling the operation of an engine, the engine comprising a microprocessor for controlling the operation of the engine, a memory for recording data, and a drive circuit according to any of the first, second or third aspects of the invention, wherein the drive circuit is controllable by the microprocessor.

According to a sixth aspect of the invention there is provided a method of detecting faults in a drive circuit for an injector arrangement comprising a fuel injector, the method comprising: a) sensing a measured voltage between the injector and a known voltage level, the measured voltage being biased with respect to the known voltage to a predicted voltage unless the drive circuit has a fault; and b) providing a fault signal on sensing of a measured voltage that differs from the predicted voltage.

The method may comprise operating selector switch means to select the fuel injector into the drive circuit. Selector switch means may be operated to deselect the fuel injector from the drive circuit. Preferably, the selector switch means is operated to enable detection of a fault. Advantageously, the selector switch means may be operated prior to detection of the fault. On deselecting the fuel injector from the drive circuit the predicted voltage may be the voltage between the fuel injector and the known voltage level. On selecting the fuel injector in the drive circuit the predicted voltage may be substantially the sum of the known voltage and a voltage across the fuel injector. In one embodiment, the method may comprise operating the selector switch at start-up of the drive circuit. In another embodiment, the selector switch may be operated during operation of the drive circuit.

The method may comprise providing the signal if the measured voltage is outside a tolerance voltage of the predicted voltage.

The detected current may be sensed through a connection of the drive circuit to the ground potential. The method further comprises providing a signal when the detected current is at variance from a threshold current. Advantageously, the signal is provided as an indication when the detected current is greater than the threshold current. The detected current is preferably sensed through a resistive element.

The connection of the drive circuit to the ground potential may be connected to charge storage means. The connection of the drive circuit to the ground potential may be connected to a discharge switch.

In a preferred embodiment, the switch means may comprise a charge switch for operably activating a charging phase. The method may comprise operating the charge switch to enable the detection of a fault associated with the drive circuit. Preferably, the charge switch is operated prior to detection of the fault. For example, in one embodiment, the method may comprise detecting a fault if substantially no charge is present on the injector. In another embodiment, the charge switch may be operated for a predetermined period of time before operating the diagnostic means in order to detect a fault. However, the charge switch is preferably closed so as to activate the charging phase.

In a preferred embodiment, the switch means may comprise a discharge switch for operably activating the discharge phase. The method may comprise closing the discharge switch so as to activate the discharge phase. On closing the discharge switch detection of a fault associated with the drive circuit may be enabled. Preferably, the discharge switch is operated prior to detection of the fault. If any charge is substantially present on the fuel injector, the method may comprise operating the discharge switch for a predetermined period of time to enable a fault to be detected.

The drive circuit may comprise a power supply means. It may also comprise regeneration switch means for operably transferring charge from the power supply means to the first charge storage means. The method may comprise operating the regeneration switch means to enable detection of a fault. Preferably, the regeneration switch means is operable prior to detection of the fault. The method may comprise operating the regeneration switch means when there is substantially no charge on the fuel injector.

The method may comprise operating the regeneration switch means at the end of the charging phase so as to transfer charge from the power supply means to the first charge storage means. The transfer of charge may occur before a subsequent discharging phase. Transferring of charge from the power supply means to the first charge storage means may be via an energy storage device.

The injector arrangement may comprise more than one fuel injector, in which case the method may comprise selecting each fuel injector in turn.

The drive circuit may be one of a plurality of drive circuits, each of which is associated with a different fuel injector. The method may comprise operating each drive circuit in turn in order to detect a fault.

All activity may be stopped on the fuel injector associated with the drive circuit before operating the drive circuit in order to detect a fault. For example, the method may comprise opening all switches of the drive circuit before operating the drive circuit in order to detect a fault.

If a fault of the drive circuit is not detected, a fuel injector is then enabled for operation.

According to a seventh aspect of the invention there is provided a method of detecting faults in a drive circuit for an injector arrangement comprising a fuel injector, the method comprising: a) sensing a detected current through a connection of the drive circuit to the ground potential; and b) providing a signal when the detected current is at variance from a threshold current.

Preferably, the signal is provided to indicate a fault when the detected current is greater than the threshold current.

The switch means may comprise a charge switch for operably activating a charging phase. In one embodiment, operation of the charge switch enables the detection of a fault associated with the drive circuit. Operation of the charge switch is, preferably, prior to detection of the fault.

The switch means may comprise a discharge switch for operably activating the discharge phase. Operation of the discharge switch may enable the detection of a fault associated with the drive circuit. Preferably, operation of the discharge switch is prior to detection of the fault.

The drive circuit may comprise a power supply means. The drive circuit may comprise regeneration switch means for operably transferring charge from the power supply means to the first charge storage means. Preferably, the method comprises operating the regeneration switch means to enable detection of a fault. Operation of the regeneration switch means may be prior to detection of the fault.

The drive circuit may comprise selector switch means for selecting the fuel injector into the drive circuit and for deselecting the fuel injector from the drive circuit. The method may comprise operating the selector switch means to enable detection of a fault. Preferably, operation of the selector switch means is prior to the detection of the fault.

Accordingly, the seventh aspect of the invention may take any of the steps of the method according to the sixth aspect of the invention.

According to an eighth aspect of the invention there is provided a method of operating the drive circuit according to the third aspect of the invention. The eighth aspect of the invention may optionally take any of the steps of the method according to the sixth or seventh aspects of the invention.

According to a ninth aspect of the invention there is provided a computer program product comprising at least one computer program software portion which, when executed in an executing environment, is operable to implement one or more of the steps of the method of the sixth, seventh or eighth aspects of the invention.

According to a tenth aspect of the invention there is provided a data storage medium having the or each computer software portion according to the ninth aspect of the invention.

According to an eleventh aspect of the invention there is provided a microcomputer provided with a data storage medium according to the aspect of the invention.

According to a twelfth aspect of the invention there is provided a method of detecting faults in a drive circuit for an injector arrangement comprising a fuel injector, the method comprising:

a) sensing a measured voltage between the injector and a known voltage level when the injector is deselected from the drive circuit; and b) providing a short circuit fault signal on sensing of a measured voltage that differs from a first predicted voltage.

According to a thirteenth aspect of the invention, there is provided a drive circuit for an injector arrangement comprising a fuel injector, the drive circuit comprising:

i) a first charge storage device for operative connection with the fuel injector during a charging phase so as to cause a charge current to flow therethrough;

ii) a second charge storage device for operative connection with the fuel injector during a discharge phase so as to permit a discharge current to flow therethrough;

iii) a switch arrangement for operably controlling the connection of the fuel injector to the first charge storage device or the second charge storage device;

iv) a selector switch arrangement operable to select the fuel injector into the drive circuit and to deselect the fuel injector from the drive circuit; and v) a diagnostic tool operable to:

a) sense a measured voltage between the injector and a known voltage level when the injector is deselected from the drive circuit; and b) provide a short circuit fault signal on sensing of a measured voltage that differs from a first predicted voltage.

According to a fourteenth of the invention, there is provided a drive circuit for an injector arrangement comprising a fuel injector, the drive circuit comprising:

a selector switch arrangement operable to select the fuel injector into the drive circuit and to deselect the fuel injector from the drive circuit; and a diagnostic tool operable to:

a) sense a measured voltage between the injector and a known voltage level when the injector is deselected from the drive circuit; and b) provide a short circuit fault signal on sensing of a measured voltage that differs from a first predicted voltage.

The terms close and activate are interchangeable when used in connection with a switch, and are intended to include the actuation of any suitable switching means to create an electrical connection across the switch. Conversely, the terms open and deactivate, when used in connection with a switch, are interchangeable, and are intended to include the actuation of any suitable switching means to break an electrical connection across the switch.

FIGURES

Preferred embodiments of the present invention will now be described, by way of example, with reference to the accompanying drawings, in which.

Figure 3:
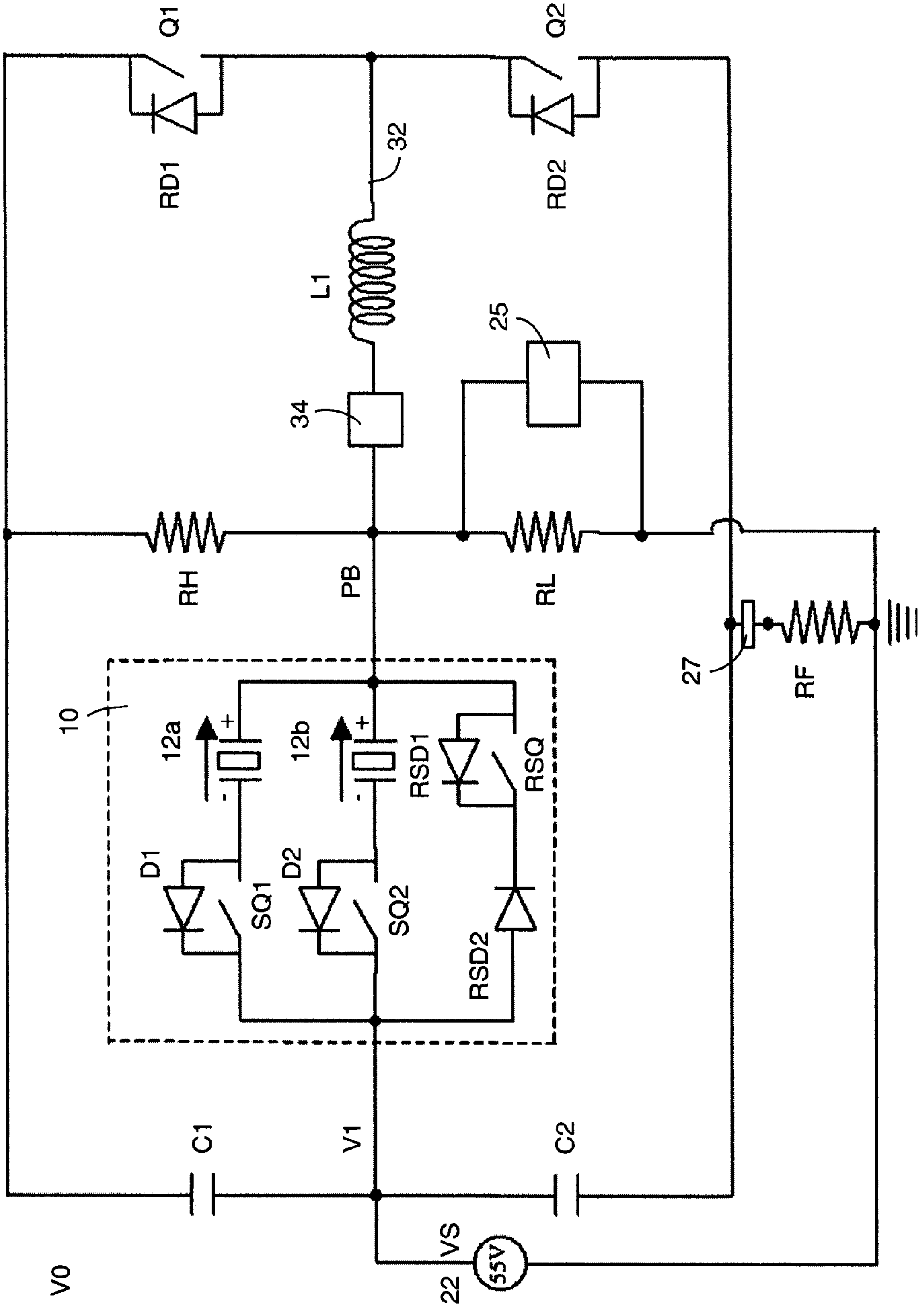
FIG. 3 is a circuit diagram as shown in FIG. 2, having a first diagnostic tool (a resistive bias network) according to a first embodiment of the present invention and a second diagnostic tool (a fault trip circuit) according to a second embodiment of the present invention.
Figure 11:
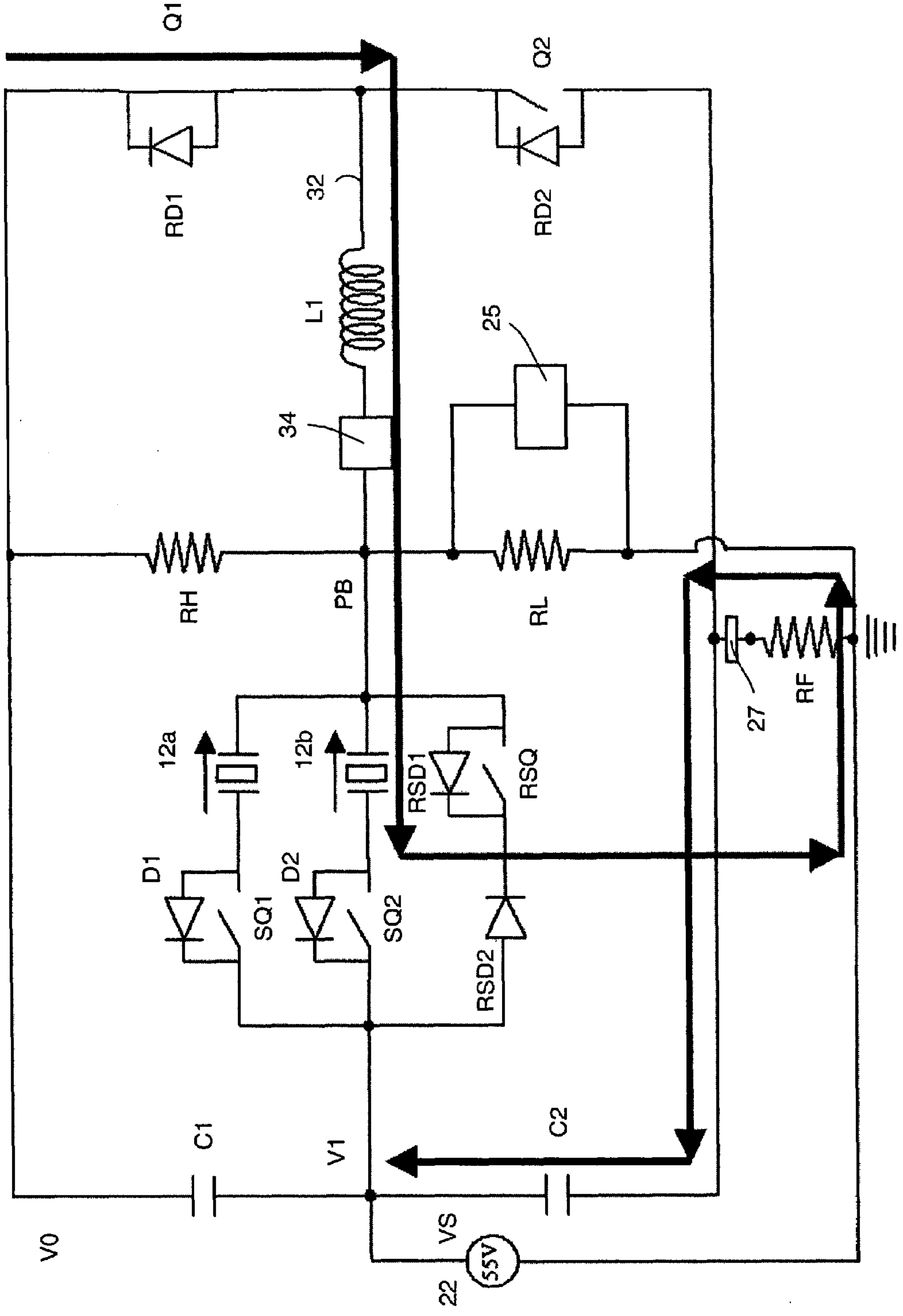
FIG. 11 is a circuit diagram illustrating the drive circuit shown in FIG. 3 with the fault trip circuit having the charge switch closed in order to detect a low side to ground potential short circuit fault.
Figure 12:
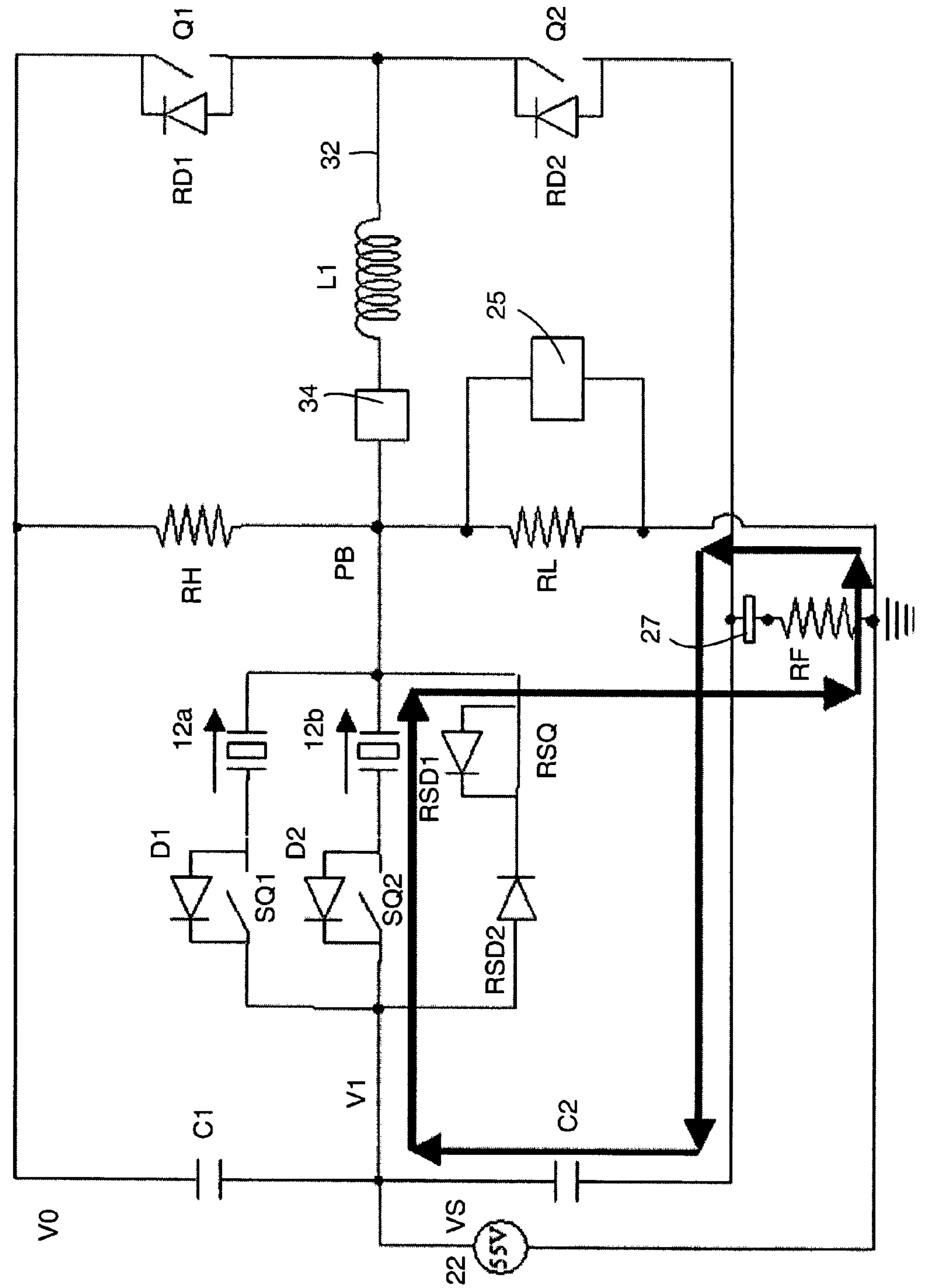
FIG. 12 is a circuit diagram illustrating the drive circuit shown in FIG. 3 with the fault trip circuit having a regeneration switch closed in order to detect a high side to ground potential short circuit fault.
Figure 13:
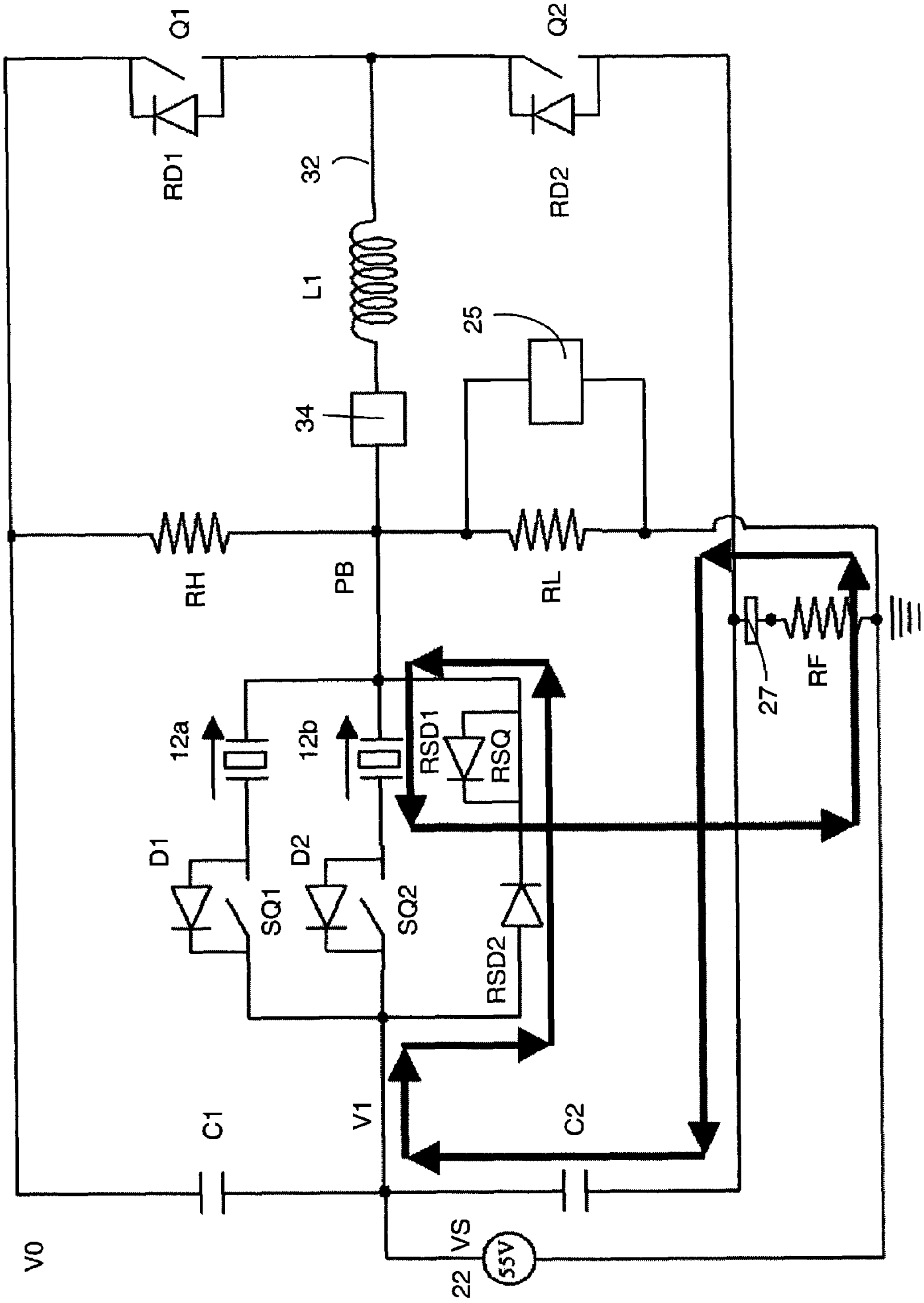
Figure 14:
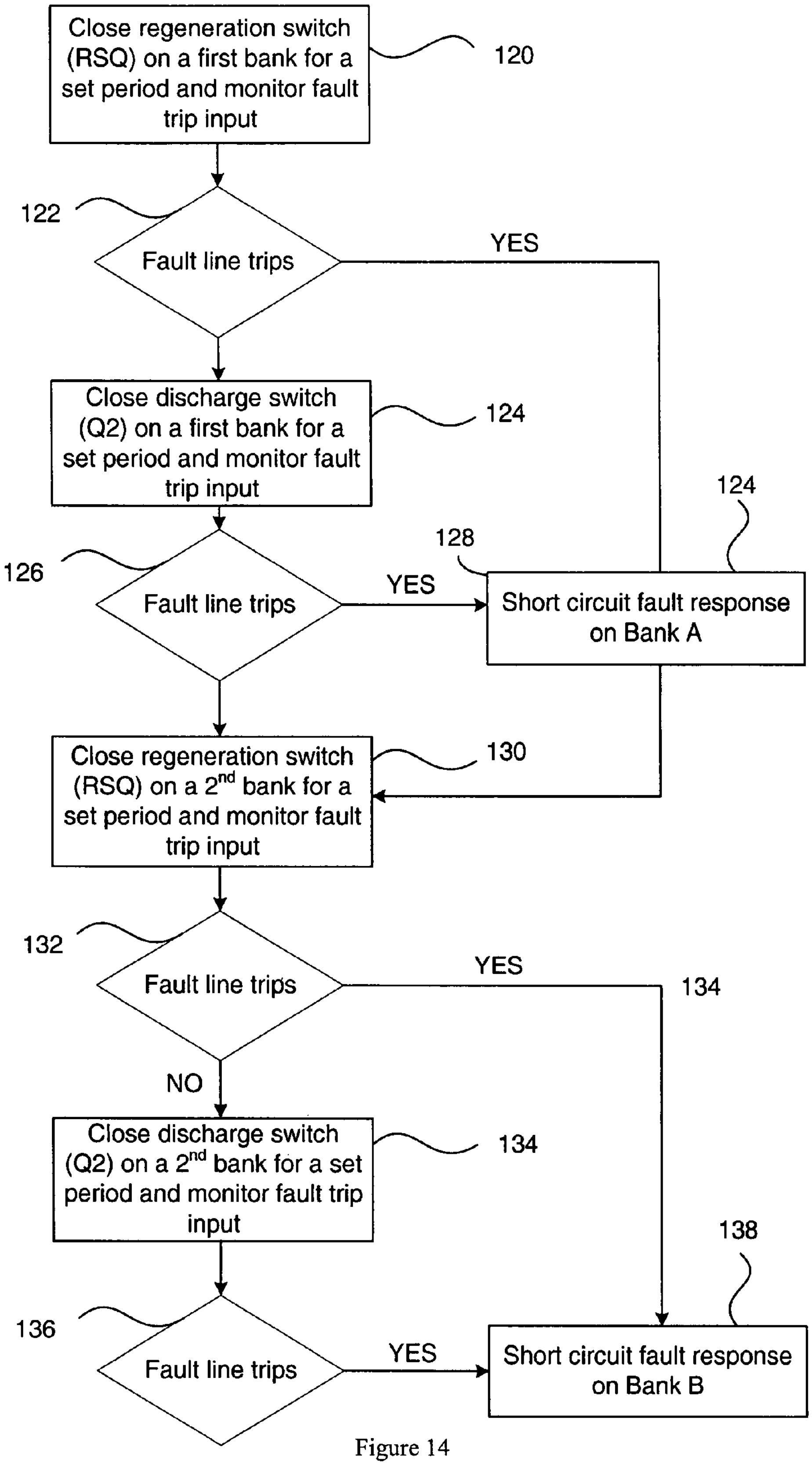

FIG. 13 is a circuit diagram illustrating the drive circuit shown in FIG. 3 with the fault trip circuit having a regeneration switch closed and having no or negligible charge on the injector, in order to detect a low side to ground potential short circuit fault; and FIG. 14 is a flow diagram of a diagnostic method of using the fault trip circuit shown in FIGS. 8 to 13, which is used when the injector arrangement is at start-up.

DETAILED DESCRIPTION

Figure 1:
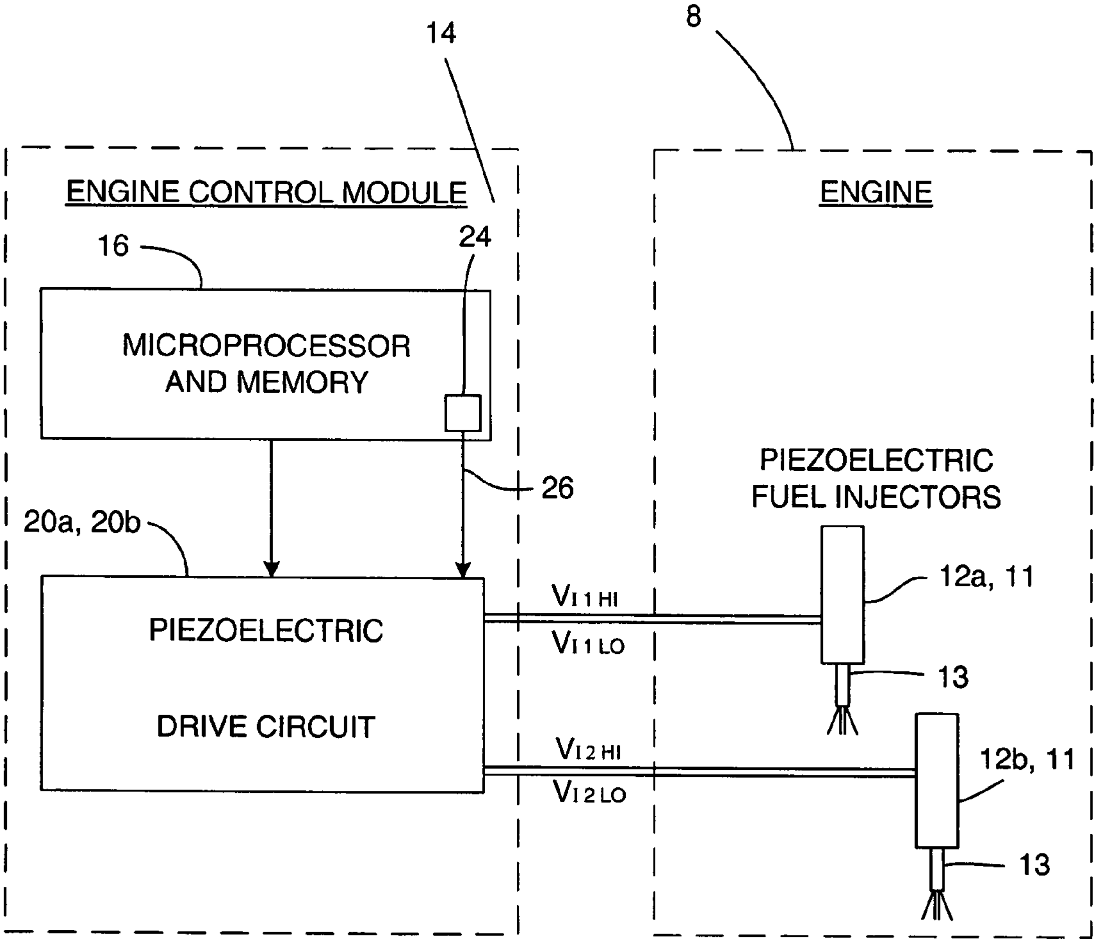
FIG. 1 is a block diagram illustrating a drive circuit for controlling a piezoelectric fuel injector arrangement in an engine.

Referring to FIG. 1, an engine 8, such as an automotive vehicle engine, is generally shown having an injector arrangement comprising a first fuel injector 12*a* and a second fuel injector 12*b*. The fuel injectors 12*a*, 12*b* each have an injector valve 13 and a piezoelectric actuator 11. The piezoelectric actuator 11 is operable to cause the injector valve 13 to open and close to control the injection of fuel into an associated cylinder of the engine 8. The fuel injectors 12*a*, 12*b* may be employed in a diesel engine to inject diesel fuel into the engine 8, or they may be employed in a spark ignited internal combustion engine to inject combustible gasoline into the engine 8.

The fuel injectors 12*a*, 12*b* form a first bank 10 of fuel injectors of the engine 8 and are controlled by means of a drive circuit 20*a*. The drive circuit 20*a* is arranged to monitor and control the injector high side voltages $V_{I1HI}$, $V_{I2HI}$ and injector low side voltages $V_{I1LO}$, $V_{I2LO}$ so as to control actuation of the first and second fuel injectors 12*a*, 12*b* respectively, to open and close the injectors. Voltages $V_{I1HI}$ and $V_{I2HI}$ represent the high side voltages of injectors 12*a*, 12*b*, respectively, and $V_{I1LO}$, $V_{I2LO}$ represent the low side voltages of fuel injectors 12*a*, 12*b*, respectively.

In practice, the engine 8 may be provided with two or more banks, each containing one or more fuel injectors and each bank having its own drive circuit 20*b* to $\mathbf{20}_N$. Where possible, for reasons of clarity, the following description relates to only one of the banks. In the preferred embodiments of the invention described below, the fuel injectors 12*a*, 12*b* are of a negative-charge displacement type. The fuel injectors 12*a*, 12*b* are therefore opened to inject fuel into the engine cylinder during a discharge phase and closed to terminate injection of fuel during a charging phase.

The engine 8 is controlled by an Engine Control Module (ECM) 14, of which the drive circuit 20*a* forms an integral part. The ECM 14 includes a microprocessor 16 and a memory 24 which are arranged to perform various routines to control the operation of the engine 8, including the control of the fuel injector arrangement. The ECM 14 is arranged to monitor engine speed and load. It also controls the amount of fuel supplied to the fuel injectors 12*a*, 12*b* and the timing of operation of the fuel injectors. The ECM 14 is connected to an engine battery (not shown) which has battery voltage $V_{BAT}$ of about 12 Volts. The ECM 14 generates the voltages required by other components of the engine 8 from the battery voltage $V_{BAT}$.

Further detail of the operation of the ECM 14 and its functionality in operating the engine 8, particularly the injection cycles of the injector arrangement, is described in detail in WO 2005/028836. Signals are transmitted between the microprocessor 16 and the drive circuit 20*a* and data, comprised in the signals received from the drive circuit 20*a*, is recorded on the memory 24.

The drive circuit 20*a* operates in three main phases: a charging phase, a discharge phase and a regeneration phase. During the discharge phase, the drive circuit 20*a* operates to discharge one of the fuel injectors 12*a*, 12*b* to open the injector valve 13 to inject fuel. During the charging phase, the drive circuit 20*a* operates to charge the fuel injector 12*a*, 12*b* to close the injector valve 13 to terminate injection of fuel. During the regeneration phase, energy in the form of electric charge is replenished to a first storage capacitor $C_1$ and a second storage capacitor $C_2$ (not shown in FIG. 1), for use in subsequent injection cycles, so that a dedicated power supply is not required. Each of these phases of operation will be described in further detail below.

Figure 2:
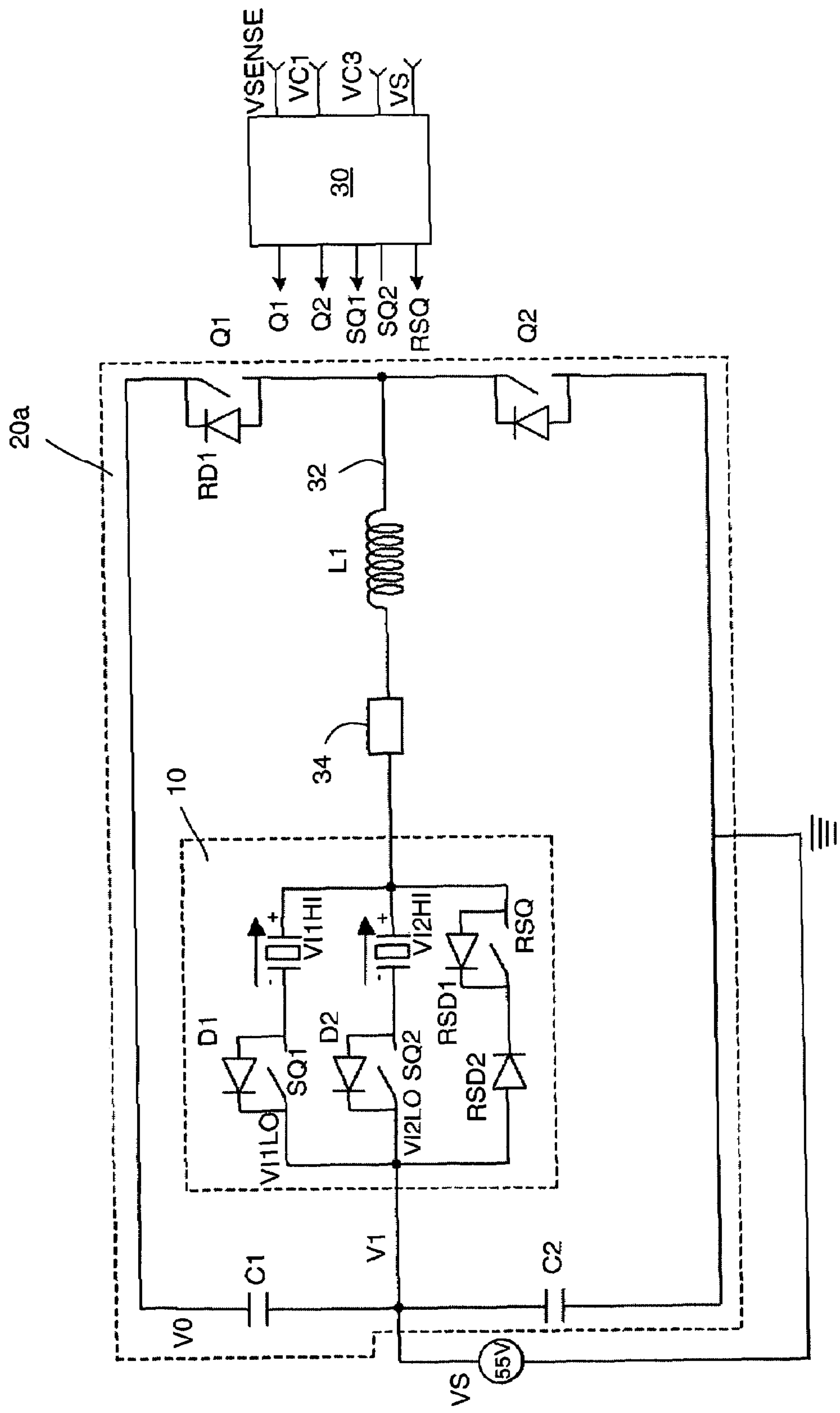
FIG. 2 is a circuit diagram illustrating the piezoelectric drive circuit in FIG. 1.

Referring also to FIG. 2, the drive circuit 20*a* comprises a first voltage rail $V_0$ and a second voltage rail $V_1$. The first voltage rail $V_0$ is at a higher voltage than the second voltage rail $V_1$. The drive circuit 20*a* also includes a half-H-bridge circuit having a middle current path 32 which serves as a bidirectional current path. The middle current path 32 has an inductor $L_1$ coupled in series with a bank 10 of fuel injectors 12*a*, 12*b*. The fuel injectors 12*a*, 12*b* and their associated switching circuitry are connected in parallel with each other.

Each fuel injector 12*a*, 12*b* has the electrical characteristics of a capacitor, with its piezoelectric actuator 11 being chargeable to hold voltage which is the potential difference between a low side (+) terminal and a high side (−) terminal of the piezoelectric actuator 11.

The drive circuit 20*a* further comprises the first storage capacitor $C_1$, and the second storage capacitor $C_2$. Each of the storage capacitors $C_1$, $C_2$ has a positive and a negative terminal. Each storage capacitor $C_1$, $C_2$ has a high side and a low side; the high side is on the positive terminal of the capacitor and the low side is on the negative terminal. The first storage capacitor $C_1$ is connected between the first voltage rail $V_0$ and the second voltage rail $V_1$. The second storage capacitor $C_2$ is connected between the second voltage rail $V_1$ and the ground potential $V_{GND}$.

In addition, the drive circuit $\mathbf{20}_a$ has a voltage source $V_S$, or power supply, 22 supplied by the ECU 14. The voltage source $V_S$ is connected between the second voltage rail $V_1$ and the ground potential $V_{GND}$, and is thus arranged to supply energy to the second storage capacitor $C_2$. Typically the voltage source $V_S$ is between 50 and 60 Volts. The drive circuit 20*a* does not have a dedicated power supply to supply charge to the first and second storage capacitors $C_1$, $C_2$. However the second storage capacitor $C_2$ is connected to the power supply 22, but the first storage capacitor $C_1$ relies on regeneration of charge to it during the regeneration phase.

In the drive circuit 20*a* there is a charge switch $Q_1$ and a discharge switch $Q_2$ for controlling, respectively, the charging and discharging operations of the first and second fuel injectors 12*a*, 12*b*. The charge and the discharge switches $Q_1$, $Q_2$ are operable by the microprocessor 16. Each of the charge and the discharge switches $Q_1$, $Q_2$, when closed, allows for unidirectional current flow through the switch and, when open, prevents current flow. The charge switch $Q_1$, has a first recirculation diode $RD_1$ connected across it. Likewise, the discharge switch $Q_2$ has a second recirculation diode $RD_2$ connected across it. These recirculation diodes $RD_1$, $RD_2$ permit recirculation current to return charge to the first storage capacitor $C_1$ and the second storage capacitor $C_2$, respectively, during an energy recirculation phase of operation of the drive circuit 20*a*, in which energy is recovered from at least one of the fuel injectors 12*a*, 12*b*.

The first fuel injector 12*a* is connected in series with an associated first selector switch $SQ_1$, and the second fuel injector 12*b* is connected in series with an associated second selector switch $SQ_2$. Each of the selector switches $SQ_1$, $SQ_2$ is operable by the microprocessor 16. A first diode $D_1$ is connected in parallel with the first selector switch $SQ_1$, and a second diode $D_2$ is connected in parallel with the second selector switch $SQ_2$. When the first selector switch $SQ_1$ (associated with the first fuel injector 12*a*) is activated, for example, a current $I_{DISCHARGE}$ is permitted to flow in a discharge direction through the selected fuel injector 12*a*. The first and second diodes $D_1$, $D_2$ each allow a current $I_{CHARGE}$ to flow in a charge direction during the charging phase of operation of the circuit, across the first and the second fuel injectors 12*a*, 12*b*, respectively.

A regeneration switch circuitry is included in the drive circuit 20*a* in parallel with the injectors 12*a*, 12*b* to implement the regeneration phase. The regeneration switch circuitry serves to connect the second storage capacitor $C_2$ to the inductor $L_1$. The regeneration switch circuitry comprises a regeneration switch RSQ which is operable by the microprocessor 16. A first regeneration switch diode $RSD_1$ is connected in parallel with the regeneration switch RSQ. A second regeneration switch diode $RSD_2$ is coupled in series to the first regeneration switch diode $RSD_1$ and the regeneration switch RSQ, and acts as a protection diode. The first and second regeneration switch diodes $RSD_1$, $RSD_2$ are opposed to each other such that current will not flow through the regeneration switch circuitry unless the regeneration switch RSQ is closed and current is flowing from the second voltage rail $V_1$. Current, thus, cannot pass through the regeneration switch circuitry during the charging phase.

The middle current path 32 includes a current sensing and control means 34 that arranged to communicate with the microprocessor 16. The current sensing and control means 34 is arranged to sense the current in the middle current path 32, to compare the sensed current with a predetermined current threshold, and to generate an output signal when the sensed current is substantially equal to the predetermined current threshold.

A voltage sensing means $V_{SENSE}$ (not shown) is also provided to sense the voltage across the fuel injector 12*a*, 12*b* selected for injection. The voltage sensing means is also used to sense the voltages $V_{C1}$, $V_{C2}$ across the first and second storage capacitors $C_1$, $C_2$, and the power supply 22. The regeneration phase is terminated when sensed voltage levels $V_{C1}$, $V_{C2}$ across the first and second storage capacitors $C_1$, $C_2$ are substantially the same as predetermined voltage levels.

The drive circuit 20*a* also includes control logic 30 for receiving the output of the current sensing and control means 34, the sensed voltage, $V_{SENSE}$, from the positive terminal (+) of the actuators 11 of the fuel injectors $\mathbf{12}_a$ and $\mathbf{12}_b$, and the various output signals from the microprocessor 16 and its memory 24. The control logic 30 includes software executable by the microprocessor 16 for processing the various inputs so as to generate control signals for each of the charge and the discharge switches $Q_1$, $Q_2$, the first and second selector switches $SQ_1$, $SQ_2$, and the regeneration switch RSQ.

During operation of the drive circuit 20*a*, a drive pulse (or voltage waveform) is applied to the piezoelectric actuator 11 of each fuel injector 12*a* and 12*b*, for example the first fuel injector 12*a*. The drive pulse varies between the charging voltage, $V_{CHARGE}$, and the discharging voltage, $V_{DISCHARGE}$. When the first fuel injector 12*a* is in a non-injecting state, prior to injection, the drive pulse is at $V_{CHARGE}$ so that a relatively high voltage is applied to the piezoelectric actuator 11. Typically, $V_{CHARGE}$ is around 200 to 300 V. When it is required to initiate an injection event, the drive pulse is reduced to $V_{DISCHARGE}$, which is typically around −100 V. To terminate injection, the voltage of the drive pulse is increased to its charging voltage level, $V_{CHARGE}$, once again.

In general, in operating a selected fuel injector (e.g. the first fuel injector 12*a*) on a bank 10, the associated drive circuit 20*a* is operated in the following manner. Firstly, the discharge switch $Q_2$ and the first selector switch $SQ_1$ of the first fuel injector 12*a* are closed. During the discharge phase that follows, the discharge switch $Q_2$ is automatically opened and closed until the voltage across the selected fuel injector 12*a* is reduced to the appropriate voltage discharge level (i.e. $V_{DISCHARGE}$,) to initiate injection. After a predetermined time when injection is required, closing of the fuel injector 12*a* is achieved by closing the charge switch $Q_1$, causing a charging current to flow through the first and second fuel injectors 12*a* and 12*b*. During the subsequent charging phase, the charge switch $Q_1$ is continually opened and closed until the appropriate charge voltage level is achieved (i.e. $V_{CHARGE}$). During the regeneration phase, the regeneration switch RSQ is activated, and the discharge switch $Q_2$ is periodically opened and closed under the control of a signal emitted by the microprocessor 16 until the energy on the first storage capacitor $C_1$ reaches a predetermined level.

The operation of the drive circuit 20*a* during the regeneration phase will now be described in further detail.

The regeneration phase follows the charging phase at the end of an injection event. During the regeneration phase, the regeneration switch RSQ (which has remained deactivated during the charging and discharge phases) is activated, and the discharge switch $Q_2$ is opened, and closed, under the control of a modulated signal from the microprocessor 16, until the energy on the first storage capacitor $C_1$ reaches a predetermined level.

With the regeneration switch RSQ closed, while the discharge switch $Q_2$ is closed, current is drawn from the power supply 22 and passes through the regeneration switch RSQ, through the second regeneration switch diode $RSD_2$, through the inductor $L_1$, through the discharge switch $Q_2$, and across the second storage capacitor $C_2$ such that the energy on the second storage capacitor $C_2$ decreases. When the discharge switch $Q_2$ is opened, current flows from the first storage capacitor $C_1$, through the second regeneration switch diode $RSD_2$, through the regeneration switch RSQ, through the current sensing and control means 34, through the inductor $L_1$, and the first recirculation diode $RD_1$ associated with the charge switch $Q_1$, to the positive terminal of the first storage capacitor $C_1$ such that the energy on the first storage capacitor $C_1$ increases. Thus, during the regeneration phase the inductor $L_1$ transfers energy from the second storage capacitor $C_2$ to the first storage capacitor $C_1$, and the power supply 22 maintains the voltage across $C_2$. Thus, the regeneration phase is used to transfer the voltage $V_S$ of the power supply 22 to the second voltage rail $V_1$ such that the voltage across the first storage capacitor $C_1$ increases.

Various modes of operation of the drive circuit 20*a* in the charging and discharge phases, and the regeneration phase, are described in detail in WO 2005/028836A1.

Faults such as short circuits and open circuit faults associated with the fuel injectors 12*a*, 12*b* in the drive circuit 20*a* have detectable fault response characteristics. These fault response characteristics are critical failure modes of a drive circuit and its associated bank. Such a fault present in the drive circuit 20*a* may affect the performance of the injector arrangement and may be critical, ultimately, to the performance of the engine 8. Although the aforementioned drive circuit 20*a* and its associated injectors 12*a*, 12*b* have already been developed, a suitable diagnostic tool and a suitable diagnostic method to detect these fault response characteristics has been, until now, unknown.

Referring to FIG. 3, the drive circuit 20*a* is provided with an integral diagnostic tool. For ease of reference all the features common to FIG. 2 have the same reference numerals in FIG. 3. The diagnostic tool provides a robust diagnostic system that is operated according to specific diagnostic methods to detect critical failure modes of the drive circuit 20*a*, and its associated piezoelectric fuel injectors 12*a*, 12*b*, thereby preventing complete failure of the drive circuit 20*a* and the fuel injectors 12*a*, 12*b*.

The diagnostic tool may be embodied, in general, in two different forms, both of which are shown in FIG. 3.

The first embodiment of the diagnostic tool is a resistive bias network comprising a first resistor $R_H$ and a second resistor $R_L$. The first resistor $R_H$ is connected between the first voltage rail $V_0$ and the high side of the fuel injectors 12*a*, 12*b* at a bias point $P_B$ that is connected to the inductor $L_1$. The second resistor $R_L$ is also connected to the high side of the fuel injectors 12*a*, 12*b*, at the bias point $P_B$, and to the ground potential $V_{GND}$. The first and second resistors $R_L$ and $R_H$ each have a known resistance of a high order of magnitude. A volt sensor 25 is connected across the second resistor $R_L$ and provides an output to the microprocessor 16. The microprocessor 16 is arranged to operate the volt sensor 25 and receives signals from the volt sensor 25 indicative of a bias voltage across the second resistor $R_L$.

In the second embodiment of the diagnostic tool, referred to as a fault trip circuit, a fault trip resistor $R_F$, in the connection of the drive circuit 20*a* to the ground potential $V_{GND}$. A current sensor 27 is connected in series with the fault trip resistor $R_F$ in order to sense the current that passes through the fault trip resistor $R_F$. The fault trip resistor $R_F$ is of very low resistance with an order of magnitude of milliohms. The microprocessor 16 is arranged to transmit control signals to the current sensor 27 and receives signals from the current sensor 27 indicative of the current flow through the fault trip resistor $R_F$.

Note that, because the fault trip resistor $R_F$ is in series with the ground potential $V_{GND}$ that is connected to all of the banks in an injector arrangement, only one fault trip resistor $R_F$ is required. Thus, in using the fault trip circuit, if a failure of the drive circuit 20*a* or the bank 10 is detected, it will only be possible in some circumstances to determine that there is a fault in the injector arrangement. It will not be possible to determine with which fuel injector 12*a*, 12*b* the fault is associated. Indeed, if the injector arrangement has more than one bank 10, it may not be possible in some circumstances to determine with which bank 10 the fault is associated.

When a bank 10 and its associated drive circuit 20*a* are operating under normal running conditions, the charges on the piezoelectric actuators 11 of the associated fuel injectors 12*a*, 12*b* of the bank 10 are accurately predictable at any point during an injection cycle. Therefore, for faults in a drive circuit 20*a* that occur whilst the drive circuit 20*a* is in operation, the charges on the piezoelectric actuators 11 of the fuel injectors 12*a*, 12*b* are generally, known. However, at start-up the charges on the piezoelectric actuators 11 are not known. Therefore, it is necessary to test for faults at start up using a different method from that used when the bank 10 is in operation. The two embodiments of the diagnostic tool (i.e. the resistive bias network with its resistors $R_H$, $R_L$, and the fault trip circuit with its fault trip resistor $R_F$) enable both types of fault to be detected, one being used whilst the drive circuit 20*a* and its associated bank 10 is in operation, and the other being used when the drive circuit 20*a* and the bank 10 are at start-up.

Referring to the features of the resistive bias network in FIG. 3, with all the switches ($Q_1$, $Q_2$, $SQ_1$, $SQ_2$, and RSQ) open, and the piezoelectric actuators 11 of both injectors 12*a*, 12*b* fully charged, the detected voltage at the bias point $P_B$ relative to the ground potential $V_{GND}$, across the second resistor $R_L$, is equal to a measured bias voltage $V_{BIAS}$. By knowing the resistance of the first resistor $R_H$ and the second resistor $R_L$, and the voltage of the first voltage rail $V_0$, a predetermined bias voltage $V_{Bcalc}$ is calculated. If there are no faults in the drive circuit 20*a* or the fuel injectors 12*a*, 12*b*, the measured bias voltage $V_{BIAS}$ is substantially the same as the predetermined bias voltage $V_{Bcalc}$. If there is a short circuit fault associated with any of the fuel injectors 12*a*, 12*b* in the particular bank 10, the measured bias voltage $V_{BIAS}$ at the bias point $P_B$ will not be the predetermined bias voltage $V_{Bcalc}$.

The value of the measured bias voltage $V_{BIAS}$ is used to determine the nature of the short circuit fault. There are three main types of short circuit fault:

1) A measured bias voltage $V_{BIAS}$ that is more than the predetermined bias voltage $V_{Bcalc}$ indicates a fully charged fuel injector 12*a*, 12*b* which has a short circuit from its low side to the ground potential $V_{GND}$.

2) A measured bias voltage $V_{BIAS}$ that is between the voltage of the second voltage rail $V_1$ and the predetermined bias voltage $V_{Bcalc}$ indicates a short circuit between the terminals of the actuator 11 of one of the fuel injectors 12*a*, 12*b*. However, a short circuit fault is considered not to be present if the measured bias voltage $V_{BIAS}$ is within a tolerance voltage of the predetermined voltage $V_{Bcalc}$. Note that the measured bias voltage $V_{BIAS}$ increases with an increase in the resistance of the short circuit.

3) A measured bias voltage $V_{BIAS}$ that is between the voltage of the second voltage rail $V_1$ and the ground potential $V_{GND}$ indicates a high side to ground potential $V_{GND}$ short circuit fault. The measured bias voltage $V_{BIAS}$ for this type of short circuit is detected irrespective of the residual voltage across the fuel injectors 12*a*, 12*b*, and the measured bias voltage $V_{BIAS}$ increases with an increase in the effective resistance of the short circuit.

Note that where the measured bias voltage $V_{BIAS}$ is around the voltage of the second voltage rail $V_1$, it is sometimes not possible accurately to determine whether the short circuit fault is a short circuit between the terminals of the actuator 11 of one of the fuel injectors 12*a*, 12*b*, or a short circuit from the high side of an actuator 11 to the ground potential $V_{GND}$.

As mentioned previously, the range of measured bias voltages $V_{BIAS}$ which are within a tolerance voltage $V_{Btol}$, either side of the predetermined bias voltage $V_{Bcalc}$, is not considered to indicate a short circuit fault because, at each of these measured bias voltage $V_{BIAS}$, the piezoelectric actuator 11 is sufficiently charged to operate its associated fuel injector 12*a*, 12*b*. Typically, the tolerance voltage $V_{Btol}$ is within 10 Volts of the predetermined bias voltage $V_{Bcalc}$.

When one of the fuel injectors 12*a*, 12*b*, for example the first fuel injector 12*a*, is selected by closing its associated selector switch $SQ_1$, the measured bias voltage $V_{BIAS}$ increases to a predicted selected injector voltage $V_{PinjN}$, that is substantially equal to the sum of the voltage of the second voltage rail $V_1$ and the voltage across the selected injector $V_{injN}$. When the fuel injector 12*a* is deselected, the associated selector switch $SQ_1$ is opened and the measured bias voltage $V_{BIAS}$ exponentially decays to a voltage level set by the resistive bias network (i.e. the first and second resistors $R_H$, $R_L$). Where the measured bias voltage $V_{BIAS}$ decay is achieved rapidly, the circuit is arranged to have a time constant that minimises the exponential decay.

When the reading of the measured bias voltage $V_{BIAS}$ is taken shortly after the deselection of the first fuel injector 12*a*, the measured bias voltage $V_{BIAS}$ should account for this exponential decay. Thus, for a time period after the deselection of the first fuel injector 12*a*, the measured bias voltage $V_{BIAS}$ will be greater than would normally be expected. Also, if the measurement is taken shortly after opening the selector switch $SQ_1$ associated with the selected fuel injector 12*a*, the measured bias voltage $V_{BIAS}$ decreases. If a short circuit is not present in the drive circuit 20*a*, the measured bias voltage $V_{BIAS}$ decreases towards the predetermined bias voltage $V_{Bcalc}$. To avoid a varying measured bias voltage $V_{BIAS}$, the measurement is taken after a predetermined time period. Alternatively, if the time constant of the exponential decay of the measured bias voltage $V_{BIAS}$ is known, this is accounted for by having a predetermined bias voltage $V_{Bcalc}$ that is time dependent, decreasing from the predicted selected injector voltage $V_{PinjN}$.

Figure 4:
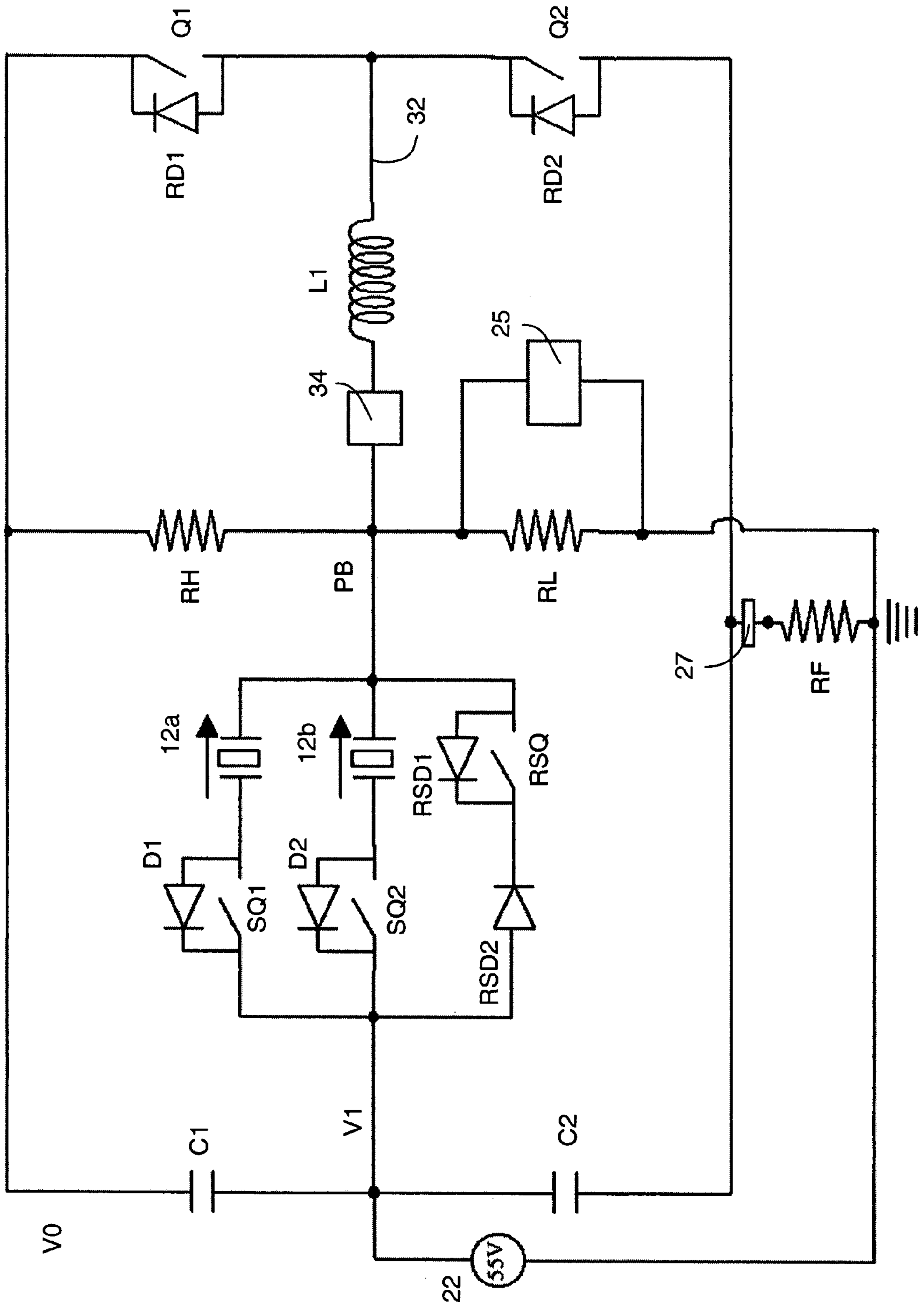
FIG. 4 is the circuit diagram of FIG. 3, configured to detect an injector with an open circuit fault using the resistive bias network.

If a short circuit fault is not detected, and the measured bias voltage $V_{BIAS}$ is within the accepted tolerance voltage $V_{Btol}$ of the predetermined bias voltage $V_{Bcalc}$, it is possible to use the resistive bias network to test for a fuel injector 12*a*, 12*b* with an open circuit fault. FIG. 4 shows an arrangement of the drive circuit 20*a* when testing for an open circuit fault having selected the second fuel injector 12*b*. The measured bias voltage $V_{BIAS}$ is again determined with all the switches ($Q_1$, $Q_2$, $SQ_1$, $SQ_2$, and RSQ) in the drive circuit 20*a* are open, with the exception of the second selector switch $SQ_2$ that is associated with the selected, second fuel injector 12*b*.

For a fault free fuel injector the measured bias voltage $V_{BIAS}$ is substantially equal to the predicted selected injector voltage $V_{PinjN}$. If the selected fuel injector 12*b* has an open circuit fault, the measured bias voltage $V_{BIAS}$ is the voltage of the first voltage rail $V_0$ as apportioned across the second resistor $R_L$, when the voltage of the first voltage rail $V_0$ is applied across the first and second resistors $R_H$, $R_L$ in series. The measured bias voltage $V_{BIAS}$ is accepted when it is within the tolerance voltage $V_{Btol}$ of the predicted selected injector voltage $V_{PinjN}$.

Figure 5:
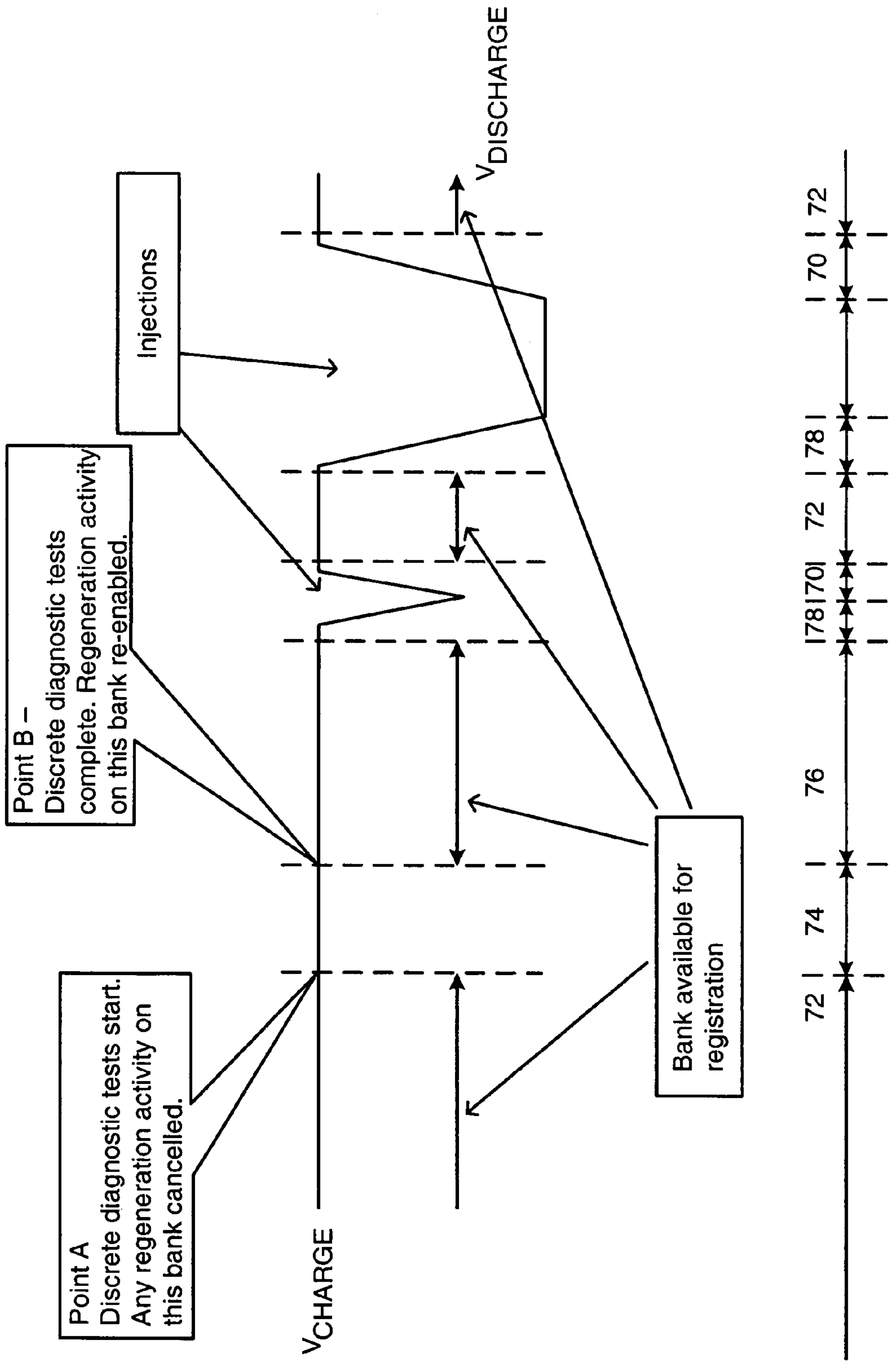
FIG. 5 is a schematic representation of a voltage waveform across a bank of injectors, illustrating the timing of the use, in an injection cycle, of the resistive bias network shown in FIG. 3.

Referring to FIG. 5, the diagnostic tests, or methods, for short and open circuit faults using the resistive bias network are carried out during normal running conditions at discrete points during the injection cycle. At completion of an injection, the drive pulse (the voltage across the fuel injector) is increased to the charge voltage level, $V_{CHARGE}$, as shown in a first period 70. The bank then undergoes the regeneration phase in a second period 72. To perform the diagnostic method of testing for short and open circuit faults using the resistive bias network, all other activity on the bank 10, including the regeneration phase, is stopped at a point A at the beginning of a third period 74. All the switches associated with the bank 10, namely the charge and the discharge switches $Q_1$, $Q_2$, the first and second selector switches $SQ_1$, $SQ_2$ and the regeneration switch RSQ, are opened. The diagnostic methods of testing are then carried out. If a short circuit fault is not detected, the appropriate switches are closed and the regeneration phase is recommenced at a point B, at the beginning of a fourth period 76. Subsequently, the discharge phase occurs, where the drive pulse is reduced to the discharge voltage level, $V_{DISCHARGE}$, in a fifth period 78, and an injection event occurs.

Figure 6:
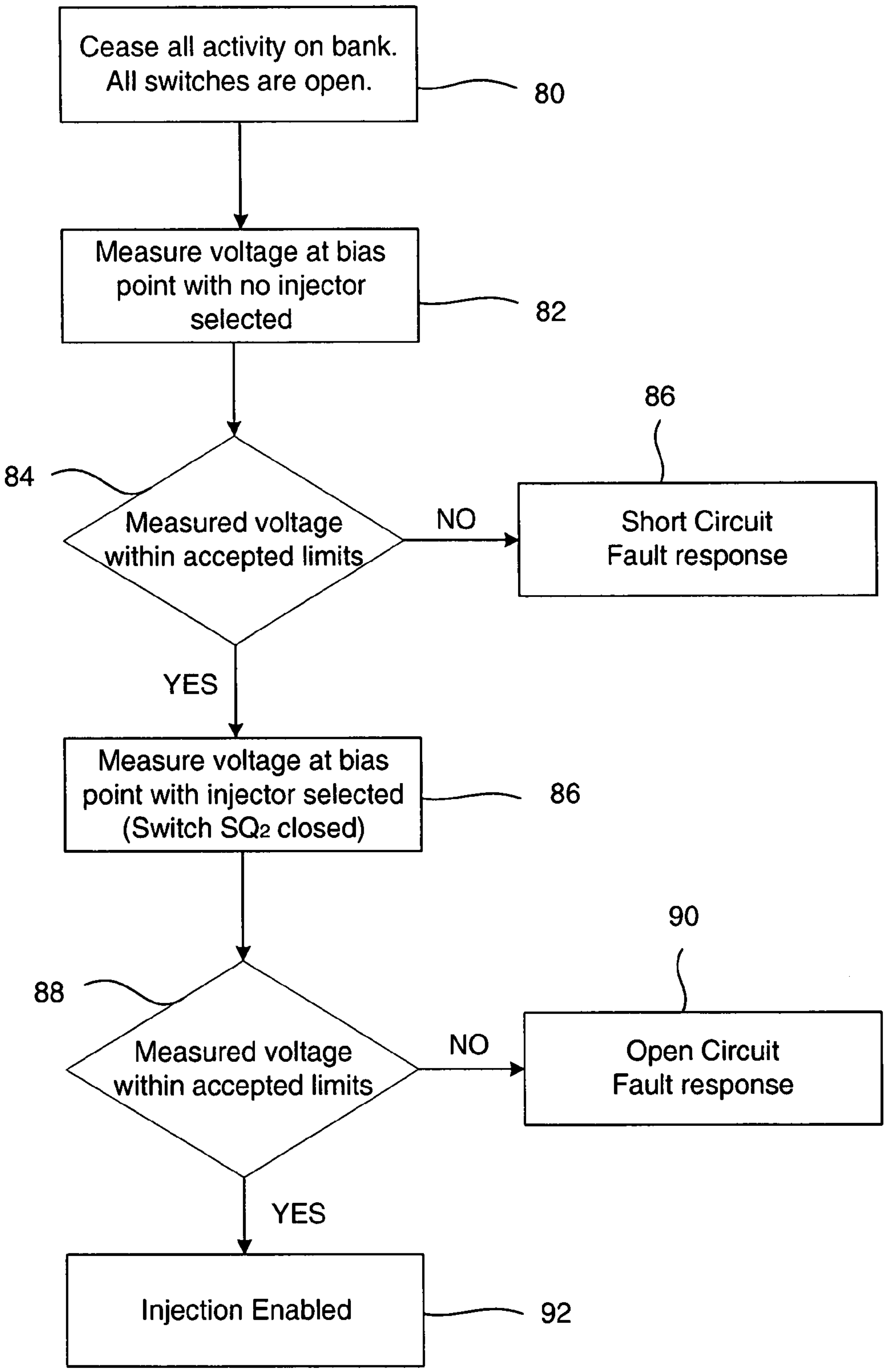
FIG. 6 is a flow diagram of a diagnostic method using the resistive bias network shown in FIG. 3 whilst the drive circuit is in operation.

Referring to FIG. 6, the preferred diagnostic method of testing using the resistive bias network whilst the bank 10 is in operation has a number of steps which are carried out during the third period 74 of the injection cycle. The diagnostic method of operating the resistive bias network will now be described in more detail.

In a first step 80, all activity on the bank 10 is ceased, and all the switches ($Q_1$, $Q_2$, $SQ_1$, $SQ_2$ and RSQ) are open.

In a second step 82, the voltage at the bias point $P_B$ is measured, without having closed one of the selector switches $SQ_1$, $SQ_2$. Thus, none of the fuel injectors 12*a*, 12*b* are selected.

In a third step 84, the measured bias voltage $V_{BIAS}$ is assessed to determine if it is within the tolerance voltage $V_{Btol}$ of the predetermined bias voltage $V_{Bcalc}$. In a fourth step 86, if the measured bias voltage $V_{BIAS}$ is outside the tolerance voltage $V_{Btol}$ of the predetermined bias voltage $V_{Bcalc}$, a short circuit is present in the bank 10, and a short circuit fault response is initiated. Alternatively, if the measured bias voltage $V_{BIAS}$ is within the tolerance voltage $V_{Btol}$ of the predetermined bias voltage $V_{Bcalc}$, the fuel injector that is next to inject in the bank 10 in the injection cycle is tested for an open circuit fault. The fuel injector that is next to inject is selected by closing the selector switch $SQ_1$, $SQ_2$ associated with the fuel injector, as described previously.

The measured bias voltage $V_{BIAS}$ is assessed in a fifth step 88 to determine if it is within the tolerance voltage $V_{Btol}$ of the predicted selected injector voltage $V_{PinjN}$.

In a sixth step 90, if the difference between the measured bias voltage $V_{BIAS}$ and the predicted selected injector voltage $V_{PinjN}$ is more than the voltage tolerance $V_{Btol}$, an open circuit fault in the bank is detected, and an open circuit fault response is initiated. In a seventh step 92, if a fault is not detected on the bank 10, injection is enabled.

The microprocessor 16 is configured to implement the method described above with reference to FIG. 6 whilst the drive circuit 20*a* and the bank 10 are in operation. Typically the method is embodied in a computer program, or a series of computer programs, stored in the memory 24 of the microprocessor 16 and executed by the microprocessor 16 to implement the method.

Figure 7:
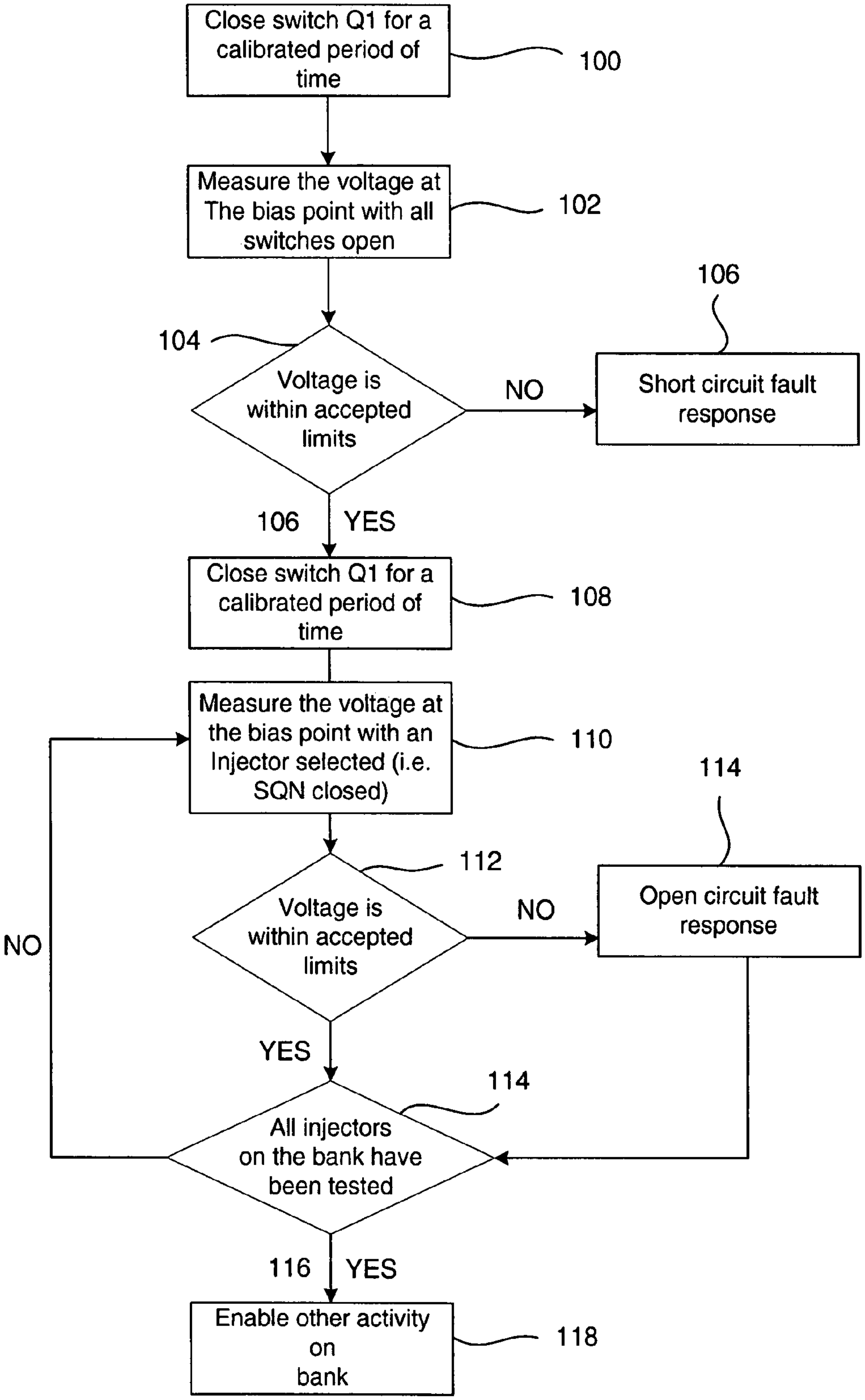
FIG. 7 is a flow diagram of a diagnostic method of using the resistive bias network shown in FIG. 3 when the injector arrangement is at start-up.

Referring to FIG. 7, the diagnostic method of testing using the resistive bias network whilst the bank is in operation is adapted for use at start-up. In a first step 100, the charge switch $Q_1$ is closed for a predetermined time.

In a second step 102, all the switches ($Q_1$, $Q_2$, $SQ_1$, $SQ_2$ and RSQ) are opened and the voltage at the bias point $P_B$ is measured in order to detect short circuit faults in the drive circuit 20*a*.

In a third step 104, the measured bias voltage $V_{BIAS}$ is assessed to determine if it is within the tolerance voltage $V_{Btol}$ of the predetermined bias voltage $V_{Bcalc}$.

In a fourth step 106, if the measured bias voltage $V_{BIAS}$ is outside the tolerance voltage $V_{Btol}$ of the predetermined bias voltage $V_{Bcalc}$, a short circuit fault is detected in the drive circuit 20*a*, and a short circuit fault response is initiated. Alternatively, if the measured bias voltage $V_{BIAS}$ is within the tolerance voltage $V_{Btol}$ of the predetermined bias voltage $V_{Bcalc}$, no short circuit is detected.

In a fifth step 108, the charge switch $Q_1$ is re-closed for a calibrated time period in order to detect an open circuit fault in the drive circuit 20*a*.

In a sixth step 110, the voltage at the bias point $P_B$ is measured, with one of the selector switches closed, for example the first selector switch $SQ_1$ in order to select the first fuel injector 12*a*.

In a seventh step 112, the measured bias voltage $V_{BIAS}$ is assessed to determine if it is within the tolerance voltage $V_{Btol}$ of the predicted selected injector voltage $V_{PinjN}$.

In an eighth step 114, if the measured bias voltage $V_{BIAS}$ at the bias point $P_B$ is not within the tolerance voltage $V_{Btol}$ of the predicted selected injector voltage $V_{PinjN}$, an open circuit fault is detected that is associated with the selected fuel injector 12*a*, 12*b*, and an open circuit fault response is initiated; otherwise an open circuit fault has not been detected.

After the eighth step 114, the method proceeds to the ninth step 116 in which the method returns to the sixth step 110 to test another of the fuel injectors 12*a*, 12*b* on the bank 10, for example the second fuel injector 12*b*. The sixth to the ninth steps 110, 112, 114, 116 are repeated until all the fuel injectors 12*a*, 12*b* on the bank 10 have been tested for an open circuit fault. Once all the fuel injectors 12*a*, 12*b* of a bank 10 have been individually tested, the method proceeds to a tenth step 118 in which other activity is enabled on the bank 10.

The microprocessor 16 is configured to implement the method at start-up of the drive circuit 20*a*, using the resistive bias network as described above with reference to FIG. 7. Typically the method is embodied in a computer program, or a series of computer programs, stored in the memory 24 of the microprocessor 16 and executed by the microprocessor 16 to implement the method.

In the fault trip circuit, the current through the fault trip resistor $R_F$ is monitored by the current sensor 27 that is operable by the microprocessor 16. In use, if a detected current $I_{dect}$ exceeds a predetermined threshold current $I_{trip}$, the circuit is arranged to trip, and the microprocessor 16 is arranged to initiate a signal.

The drive circuit 20*a* is arranged to trip if one of the fuel injectors 12*a*, 12*b* has a low side, or a high side, short circuit fault to the ground potential $V_{GND}$ at any time when any of the switches ($Q_1$, $Q_2$, $SQ_1$, $SQ_2$ and RSQ) are closed. A number of arrangements of the switches ($Q_1$, $Q_2$, $SQ_1$, $SQ_2$ and RSQ) in the drive circuit 20*a* will now be described in detail with reference to FIGS. 8 to 11. In all these arrangements all of the switches ($Q_1$, $Q_2$, $SQ_1$, $SQ_2$ and RSQ) are open, unless specifically mentioned. Also, note that each of these figures has a bold line that represents the path in the drive circuit 20*a* taken by the short circuit current.

In all these arrangements, the corresponding figures show the short circuit affecting the second fuel injector 12*b*. The short circuit might equally be located in the first fuel injector 12*a*, or any other fuel injector present in the bank 10.

By operating the fault trip circuit, it is not possible to determine with which fuel injector of the bank 10 the fault is associated, because only one fault trip resistor $R_F$ is present in the drive circuit 20*a*. In another injector arrangement that comprises more than one bank 10 the fault trip circuit can detect the presence of a short circuit fault in the injector arrangement but cannot be used to identify the fuel injector 12*a*, 12*b*, or even the specific bank, with which the fault is associated.

Figure 8:
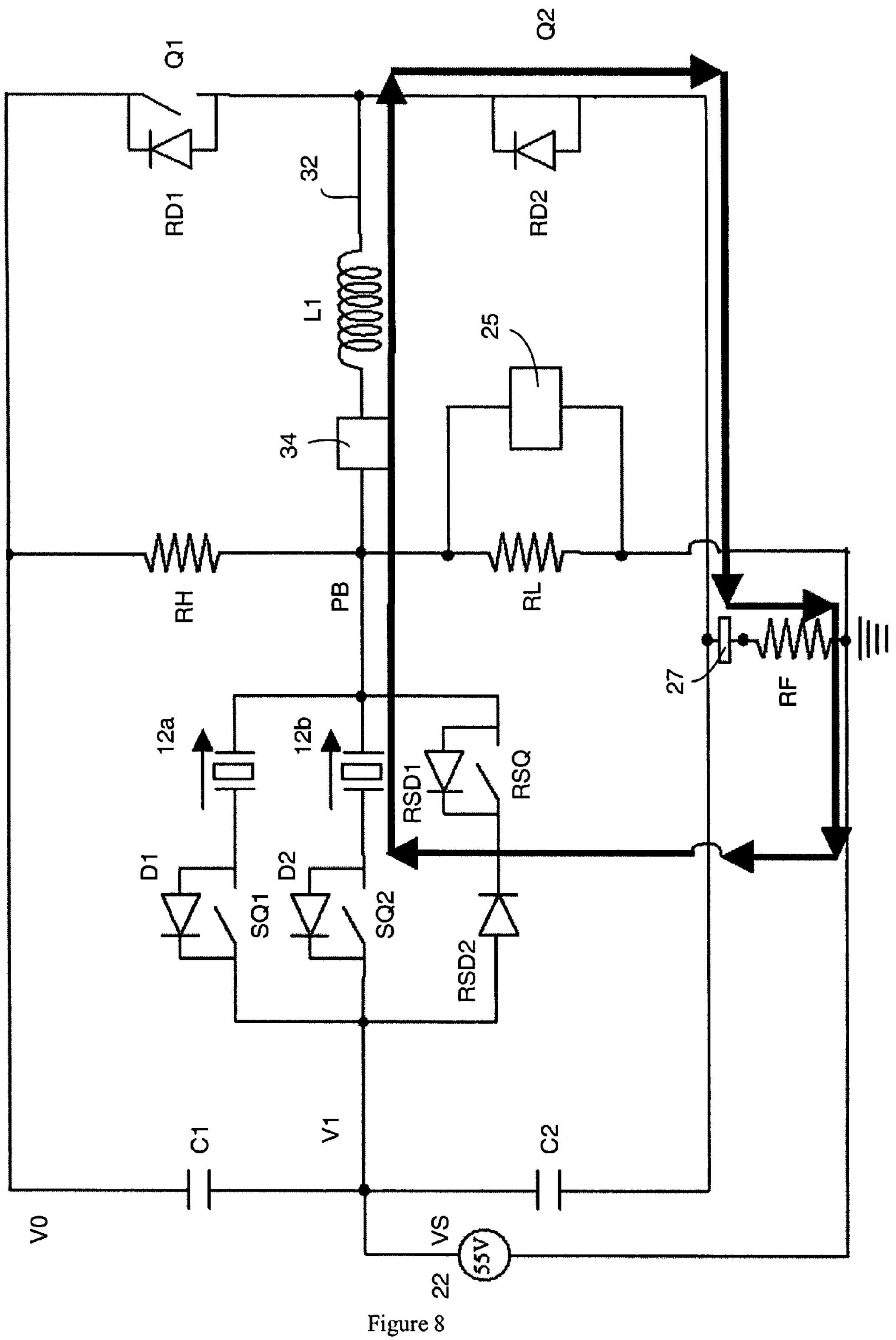
FIG. 8 is a circuit diagram illustrating a drive circuit shown in FIG. 3 with the fault trip circuit having a discharge switch closed, and having residual charge on a fuel injector, in order to detect a low side to ground potential short circuit fault.

Referring to FIG. 8, when the discharge switch $Q_2$ is closed and all the other switches ($Q_1$, RSQ, $SQ_1$ and $SQ_2$) of the drive circuit 20*a* are open, a low side to ground potential $V_{GND}$ short circuit fault associated with the selected, second fuel injector 12*b* is detectable. Note that the short circuit shown in FIG. 8 is only detectable if there is residual charge on the second fuel injector 12*b*.

Figure 9:
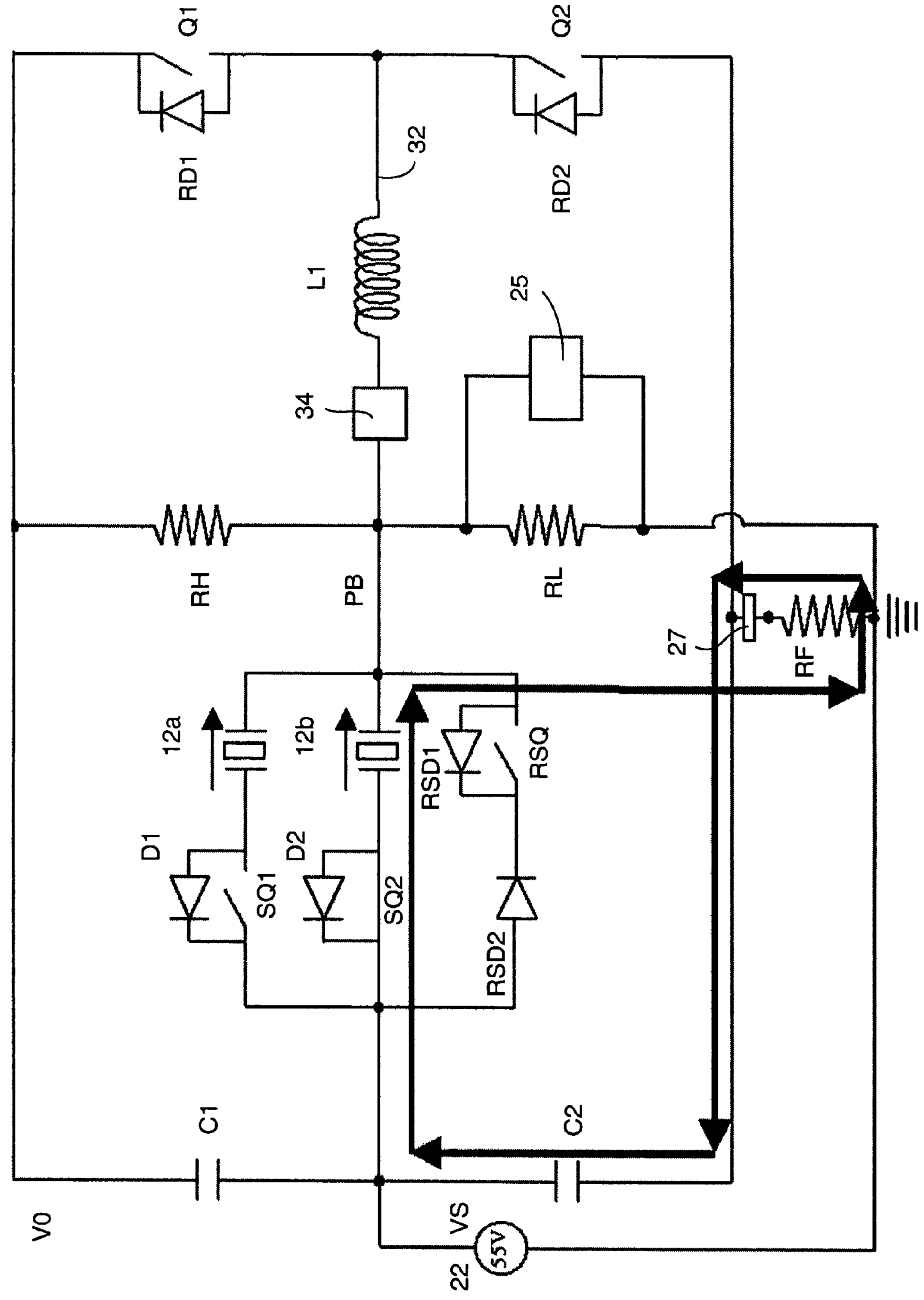
FIG. 9 is a circuit diagram illustrating the drive circuit shown in FIG. 3 with the fault trip circuit having an injector selector switch closed in order to detect a high side to ground potential short circuit fault.

Referring to FIG. 9, when the second selector switch $SQ_2$ is closed and all the other switches ($Q_1$, $Q_2$, $SQ_1$ and RSQ) of the drive circuit 20*a* are open it is possible to detect a high side to ground potential $V_{GND}$ short circuit fault associated with the second fuel injector 12*b*.

Figure 10:
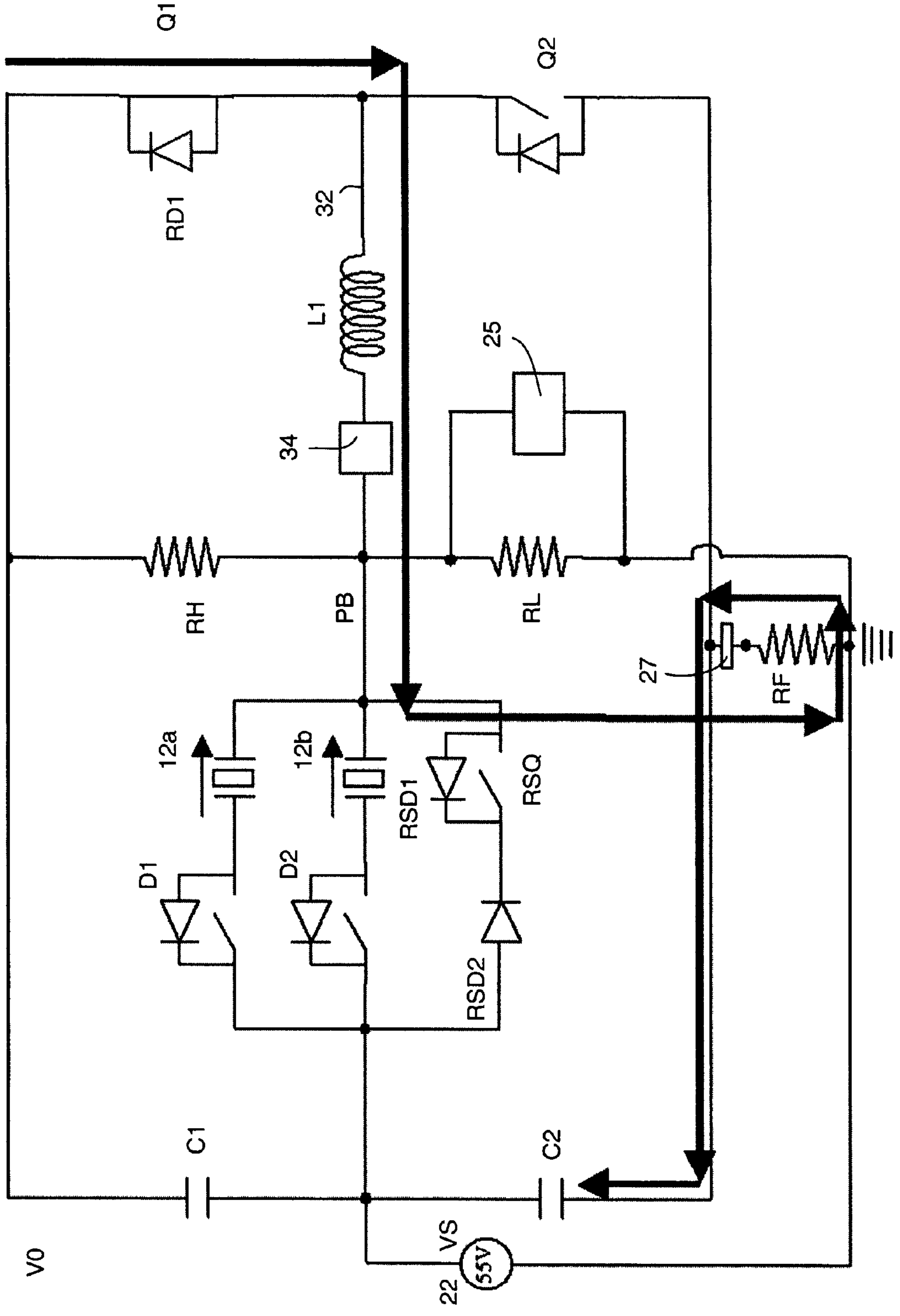
FIG. 10 is a circuit diagram illustrating the drive circuit shown in FIG. 3 with the fault trip circuit having a charge switch closed in order to detect a high side to ground potential short circuit fault.

Referring to FIGS. 10 and 11, on closing the charge switch $Q_1$, when all the other switches (RSQ, $Q_2$, $SQ_1$ and $SQ_2$) of the drive circuit 20*a* are open, two possible short circuit faults are detectable. In the drive circuit 20*a* shown in FIG. 10, there is a high side short circuit fault to the ground potential $V_{GND}$ that is associated with the second fuel injector 12*b*. In the drive circuit 20*a* in FIG. 11, there is a low side short circuit fault to the ground potential $V_{GND}$, associated with the second fuel injector 12*b*. Note that the short circuit shown in FIG. 11 is only detectable if there is little, if any, residual charge on the second fuel injector 12*b*.

In each of FIGS. 12 and 13, the regeneration switch RSQ is closed, and all the other switches ($Q_1$, $Q_2$, $SQ_1$ and $SQ_2$) of the drive circuit 20*a* are open. In the drive circuit 20*a* shown in FIG. 12 a high side to ground potential $V_{GND}$ short circuit fault that is associated with the second fuel injector 12*b* is detectable. In the drive circuit 20*a* shown in FIG. 13 a low side to ground potential $V_{GND}$ short circuit fault that is associated with the second fuel injector 12*b* is detectable. However, the short circuit fault shown in FIG. 13 is only detectable if there is no, or negligible, charge on the selected, second fuel injector 12*b*.

During one injection cycle of the given fuel injector 12*a*, 12*b* whilst the drive circuit 20*a* is operating under normal running conditions, the drive circuit 20*a* is operated through the operating states shown in FIGS. 9 to 13. Thus, all of the different types of short circuit fault that are described above in reference to FIGS. 9 to 13 are detectable. It will be appreciated that the arrangement shown in FIG. 8 does not occur in the injection cycle.

As mentioned previously, in an injector arrangement comprising more than one bank, it is not possible to determine with which bank a short circuit fault is associated during normal running conditions when using the fault trip circuit. In addition, where one of the banks comprises more than one fuel injector 12*a*, 12*b*, it is also not possible to identify, by using this fault trip circuit during normal running conditions, with which fuel injector 12*a*, 12*b* on the bank that the fault is associated. In order to determine with which bank the fault is associated, the fault trip circuit may be tripped deliberately at start-up.

The circuitry of the fault trip circuit is tripped deliberately at start-up by operating the regeneration switch RSQ of a bank 10, or the discharge switch $Q_2$ of the associated drive circuit 20*a*, as shown in FIGS. 8, 12 and 13. The fault trip circuit is used in preference to the resistive bias network at start-up because the resistive bias network is less reliable at start-up than the fault trip circuit due to the possibility of unknown voltages being present across the fuel injectors 12*a*, 12*b*.

FIG. 14 shows, in the form of a flow diagram, the steps of the method used to trip the fault trip circuit deliberately when applied to an injector arrangement comprising at least two banks: the first bank 10, and a second bank 10*b*. If the injector arrangement comprises more than two banks, the same steps that are applied to each of the first two banks 10, 10*b* are then applied to the third and further banks, 10*c* to $\mathbf{10}_N$, in turn.

Starting with a first step 120, the regeneration switch RSQ is closed on the first bank 10 of the injector arrangement for a predetermined period of time.

In a second step 122 the current flowing through the fault trip resistor $R_F$ is monitored in order to measure the detected current $I_{dect}$.

If the detected current $I_{dect}$ exceeds the threshold current $I_{trip}$, in a third step 124, a short circuit fault response is initiated. The testing of the first bank 10 is now complete, and the method proceeds directly to a sixth step 130. Alternatively, if the measured current does not equal or exceed the threshold current $I_{trip}$, the discharge switch $Q_2$ of the first bank 10 is closed for a predetermined amount of time.

In a fourth step 126, the current passing through the fault trip resistor $R_F$ is monitored in order to measure the detected current $I_{dect}$.

In a fifth step 128, if the detected current $I_{dect}$ exceeds the threshold current $I_{trip}$, a short circuit fault response is initiated.

The testing of the first bank 10 is now complete. The method continues by testing the second bank 10*b*. In the sixth step 130, the regeneration switch RSQ of the second bank 10*b* is closed for a predetermined amount of time.

In a seventh step 132, the current passing through the fault trip resistor $R_F$ is monitored to measure the detected current $I_{dect}$.

In an eighth step 134, if the detected current $I_{dect}$ is in excess of the threshold current $I_{trip}$, a short circuit fault response is initiated and the testing of the second bank 10*b* is complete. The injector arrangement is now ready for start-up. Alternatively, if the measured current does not equal or exceed the threshold current $I_{trip}$, the discharge switch $Q_2$ of the second bank 10*b* is closed for a predetermined amount of time.

In a ninth step 136, the current passing through the fault trip resistor $R_F$ is monitored to measure the detected current $I_{dect}$.

In a tenth step 138, if the measured current is in excess of the threshold current $I_{trip}$, a short circuit fault response is initiated.

In using this diagnostic method at start up, only one bank is active at a time. All other activities on the injector arrangement are disabled whilst this diagnostic method of testing is in progress. Thus, the bank 10, 10*b* in which the short circuit fault is present is identifiable.

The microprocessor 16 is configured to implement the diagnostic methods of testing the drive circuit 20*a* using the fault trip circuit at start-up, and during normal running conditions of the drive circuit 20*a*. Typically the method is embodied in a computer program, or a series of computer programs, stored in the memory 24 of the microprocessor 16 and executed by the microprocessor 16 to implement these methods.

In the preferred embodiment, both the fault trip circuit and the bias network are present in the drive circuit 20*a*. They are used independently to detect short circuits, but only the bias network is capable of being used to detect open circuit faults. These two diagnostic tools are, thus, complementary.

As mentioned previously, where the fault trip circuit is used during normal running conditions of an injector arrangement that has at least two banks 10, 10*b*, it is not possible to determine with which the bank the short circuit fault is associated. At start-up, as an alternative to tripping the fault trip circuit deliberately, the resistive bias network can be used to identify with which bank 10, 10*b* the short circuit is associated, because there is a bias network integrated into each drive circuit 20*a*, 20*b*. The bank 10, 10*b* is identified by applying to each of the drive circuits 20*a*, 20*b* the diagnostic method in which the bias network is used.

The steps of the diagnostic method in which the resistive bias network is used to detect open circuit faults may be combined with the diagnostic method in which the fault trip circuit is used. The combined diagnostic method can therefore detect reliably both short and open circuit faults at start-up.

At start-up of an injector arrangement that has at least two banks 10, 10*b* (each having an associated drive circuit 20*a*, 20*b*) it is preferable to apply the diagnostic method in which the fault trip circuit is used, instead of the bias network. This is because the diagnostic method in which the bias network is used is limited in its performance by the presence of an unknown voltage across each of the fuel injectors 12*a*, 12*b*. However, because it is not possible to detect open circuit faults using the fault trip circuit, the diagnostic method in which the resistive bias network is used is applied to each of the drive circuits 20*a*, 20*b* of the injector arrangement after the diagnostic method using the fault trip circuit has been applied.

Having described preferred embodiments of the present invention, it is to be appreciated that the embodiments in question are exemplary only and that variations and modifications, such as will occur to those possessed of the appropriate knowledge and skills, may be made without departure from the scope of the invention as set forth in the appended claims.

The diagnostic methods in which the resistive bias network is used are capable of detecting both short and open circuit faults. These methods may be used to detect these two types of fault separately, instead of together as described for the preferred embodiment. Thus the resistive biasing network may be adapted to test only for short circuit faults or only for open circuit faults.

Only one of the two aforementioned diagnostic tools, the resistive bias network and the fault trip circuit, may be included in the drive circuit 20*a*.

The drive circuit 20*a* herein described is a generic drive circuit. The resistive bias network and fault trip circuit may be adapted for use with similar drive circuits which obviate the need for a dedicated power supply, for example, the drive circuits described in WO 2005/028836.

Other types of drive circuit may be used with each of the diagnostic tools. For example, the drive circuit may only have one voltage rail, or it may not have the circuitry that is used in the regeneration phase.

In the aforementioned description the drive circuit 20*a* is integrated within the ECM 14. In another embodiment, however, the drive circuit 20*a* is separate from, but connected to, the rest of the ECM 14.

In the aforementioned description, the fuel injectors 12*a*, 12*b* are of a negative-charge displacement type. However, in another embodiment the fuel injectors 12*a*, 12*b* are of a positive-charge displacement type, in which case the drive circuits 20*a* are configured with the fuel injectors 12*a*, 12*b* so that the fuel injectors 12*a*, 12*b* are open to inject fuel during a charging phase and are closed to terminate fuel injection during a discharge phase.

In an injector arrangement that has more than two banks, the method of operating the fault trip circuit at start up is applied to each of the banks of the injector arrangement. After the first two banks 10, 10*b* have been tested, the method is repeated from the sixth step 130 to the tenth step 138, inclusive, on each of the third and further banks 10*c* to $\mathbf{10}_N$.

In a further variation of the preferred embodiment, the fault trip resistor $R_F$ operates as the current sensor 27.

The diagnostic methods that test the drive circuit 20*a* for short circuit faults to the ground potential $V_{GND}$ are also capable of detecting equivalent short circuits to the voltage $V_{BAT}$ of the engine battery.

In modifications of the preferred embodiment, the tolerance voltage may be any value so that the measured bias voltage is sufficient to operate the fuel injector 12*a*, 12*b* concerned. For example, the tolerance voltage may be between 5 and 20 Volts.

Note that it is not necessary to shut down a bank in the case of a single open circuit fuel injector because the other fuel injectors in the bank are able to function normally. In such a bank, it is still possible to inject on any other of the fuel injectors in the bank and it is still possible to perform regeneration.

In a variation of the preferred embodiment, each bank has a current sensor 27. In such a drive circuit it would be possible using the plurality of current sensors 27 to determine with which bank a detected short circuit fault is associated, because the fault is only detectable by the current sensor 27 of the bank associated with the fault.

Although the preferred embodiment refers to only two injectors 12*a*, 12*b* on a bank 10, in variations a bank may have a plurality of injectors 12*a* to $\mathbf{12}_N$, with a corresponding number of selector switches $SQ_1$ to $SQ_N$.

The invention claimed is:

1. A drive circuit for an injector arrangement comprising a fuel injector, the drive circuit comprising a diagnostic tool operable:

a) to sense a measured voltage between the injector and a known voltage level, the measured voltage being biased with respect to the known voltage to a predicted voltage unless the drive circuit has a fault; and b) to provide a fault signal on sensing of a measured voltage that differs from the predicted voltage;

wherein said drive circuit further comprises a first charge storage device for operative connection with the fuel injector during a charging phase so as to cause a charge current to flow therethrough, a second charge storage device for operative connection with the fuel injector during a discharge phase so as to permit a discharge current to flow therethrough, and a switch arrangement for operably controlling the connection of the fuel injector to the first charge storage device or the second charge storage device.

2. A drive circuit as claimed in claim 1, the drive circuit further comprising a selector switch arrangement operable to select the fuel injector into the drive circuit and to deselect the fuel injector from the drive circuit.

3. A drive circuit as claimed in claim 2, wherein the predicted voltage is the voltage between the fuel injector and the known voltage level when the injector is deselected from the drive circuit.

4. A drive circuit as claimed in claim 2, wherein the predicted voltage is substantially the sum of the known voltage and a voltage across the fuel injector when the fuel injector is selected in the drive circuit.

5. A drive circuit as claimed in claim 2, wherein the selector switch arrangement is operable prior to detection of a fault.

6. A drive circuit as claimed in claim 1, wherein the signal is provided if the measured voltage is outside a tolerance voltage of the predicted voltage.

7. A drive circuit as claimed in claim 1, wherein the measured voltage is sensed across part of a potential divider connected to the injector and the known voltage.

8. A drive circuit as claimed in claim 1, wherein the drive circuit further comprises a further diagnostic tool in a connection of the drive circuit to a ground potential, the further diagnostic tool being operable:

a) to sense a detected current; and b) to provide a signal on detection of a fault, wherein the signal is provided when the detected current is at variance from a threshold current.

9. A drive circuit as claimed in claim 1, wherein the switch arrangement comprises a charge switch operable to close so as to activate the charging phase.

10. A drive circuit as claimed in claim 1, wherein the switch arrangement comprises a discharge switch operable to close so as to activate the discharge phase.

11. A drive circuit as claimed in claim 1, further comprising a power supply and regeneration switch operable at the end of the charging phase to transfer charge from the power supply to the first charge storage device, before a subsequent discharging phase.

12. A method of detecting faults in a drive circuit for an injector arrangement comprising a fuel injector, a first charge storage device for operative connection with the fuel injector during a charging phase so as to cause a charge current to flow therethrough, a second charge storage device for operative connection with the fuel injector during a discharge phase so as to permit a discharge current to flow therethrough, and a switch arrangement for operably controlling the connection of the fuel injector to the first charge storage device or the second charge storage device, the method comprising:

charging the first charge storage device and the second charge storage device;

controlling the connection of the fuel injector to the first charge storage device;

controlling the connection of the fuel injector to the second charge storage device;

sensing a measured voltage between the injector and a known voltage level, the measured voltage being biased with respect to the known voltage to a predicted voltage unless the drive circuit has a fault; and providing a fault signal on sensing of a measured voltage that differs from the predicted voltage.

13. A method as claimed in claim 12, wherein the method further comprises operating selector a switch arrangement to select the fuel injector into the drive circuit and to deselect the fuel injector from the drive circuit.

14. A method as claimed in claim 12, further comprising:

i) sensing a detected current through a connection of the drive circuit to the ground potential; and ii) providing a signal when the detected current is at variance from a threshold current.

15. A method as claimed in claim 12, the injector arrangement comprising more than one fuel injector, wherein the method comprises selecting each fuel injector in turn.

16. A method of detecting faults in a drive circuit for an injector arrangement comprising a fuel injector, a first charge storage device for operative connection with the fuel injector during a charging phase so as to cause a charge current to flow therethrough, a second charge storage device for operative connection with the fuel injector during a discharge phase so as to permit a discharge current to flow therethrough, and a switch arrangement for operably controlling the connection of the fuel injector to the first charge storage device or the second charge storage device, the method comprising:

charging the first charge storage device and the second charge storage device;

controlling the connection of the fuel injector to the first charge storage device;

controlling the connection of the fuel injector to the second charge storage device;

sensing a measured voltage between the injector and a known voltage level when the injector is deselected from the drive circuit; and providing a short circuit fault signal on sensing of a measured voltage that differs from a first predicted voltage.

17. A method as claimed in claim 16, further comprising sensing a measured voltage between the injector and the known voltage level when the injector is selected in the drive circuit; and providing an open circuit fault signal on sensing of a measured voltage that differs from a second predicted voltage.

18. A computer program product comprising at least one computer program software portion which, when executed in an executing environment, is operable to implement the steps of the method as claimed in claim 16.

19. A data storage medium having a computer software portion of claim 18.

20. A microcomputer provided with a data storage medium as claimed in claim 19.

* * * * *